(12) United States Patent
Fukutomi

(10) Patent No.: US 12,229,412 B2
(45) Date of Patent: Feb. 18, 2025

(54) MEMORY SYSTEM MANAGING COUNTERS

(71) Applicant: Kioxia Corporation, Tokyo (JP)

(72) Inventor: Kazuhiro Fukutomi, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/176,446

(22) Filed: Feb. 28, 2023

(65) Prior Publication Data
US 2024/0004555 A1 Jan. 4, 2024

(51) Int. Cl.
*G06F 3/06* (2006.01)
*G06F 12/0802* (2016.01)

(52) U.S. Cl.
CPC .......... *G06F 3/0616* (2013.01); *G06F 3/0653* (2013.01); *G06F 3/0679* (2013.01); *G06F 12/0802* (2013.01); *G06F 2212/304* (2013.01); *G06F 2212/45* (2013.01)

(58) Field of Classification Search
CPC .... G06F 3/0616; G06F 3/0653; G06F 3/0679; G06F 12/0238; G06F 12/0802; G06F 12/0868; G06F 2212/1036; G06F 2212/214; G06F 2212/304; G06F 2212/313; G06F 2212/45; G06F 2212/466; G06F 2212/7207
See application file for complete search history.

(56) References Cited

U.S. PATENT DOCUMENTS

| | | | |
|---|---|---|---|
| 9,612,953 B1 | 4/2017 | Davis et al. | |
| 10,007,462 B1 | 6/2018 | Van Gaasbeck et al. | |
| 11,074,183 B2 | 7/2021 | Chang et al. | |
| 2013/0339587 A1* | 12/2013 | Asnaashari | G06F 11/20 711/103 |
| 2016/0034194 A1* | 2/2016 | Brokhman | G06F 12/0246 711/103 |
| 2021/0349833 A1* | 11/2021 | Bauman | G06F 16/164 |

* cited by examiner

*Primary Examiner* — Larry T MacKall
(74) *Attorney, Agent, or Firm* — Kim & Stewart LLP

(57) ABSTRACT

A memory system includes a nonvolatile memory that includes a plurality of regions; a volatile memory; and a controller that is connected to the nonvolatile memory and the volatile memory. The controller is configured to store in the volatile memory a plurality of first counter values each indicating the number of times each of the plurality of regions has been accessed and a plurality of second counter values respectively corresponding to the plurality of first counter values, and write the first counter value of a first region of the plurality of regions to the nonvolatile memory in response to the second counter value of the first region being equal to or more than a threshold value.

20 Claims, 26 Drawing Sheets

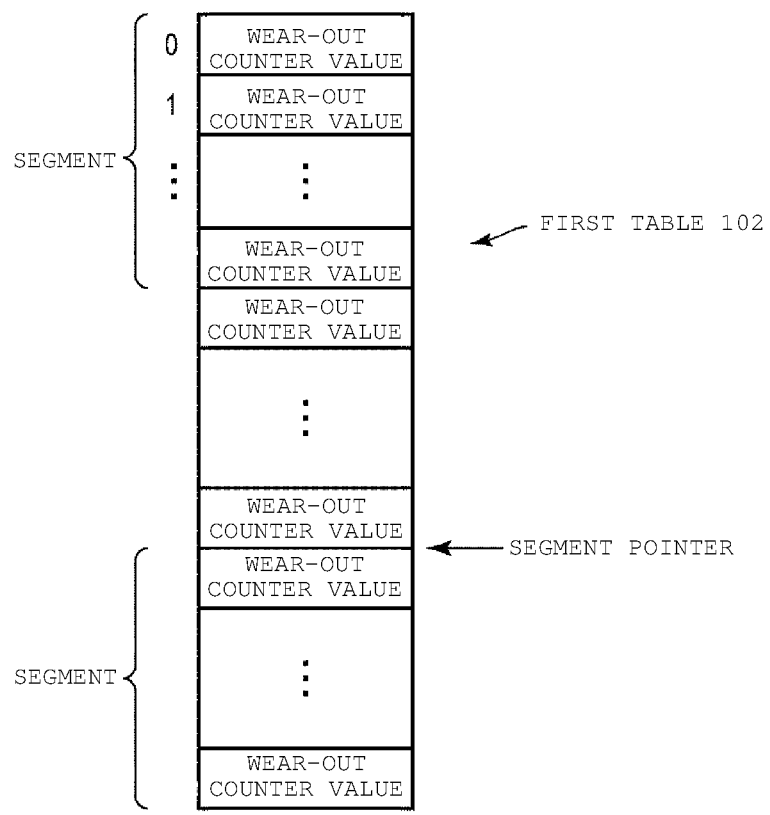

*FIG. 5A*          *FIG. 5B*
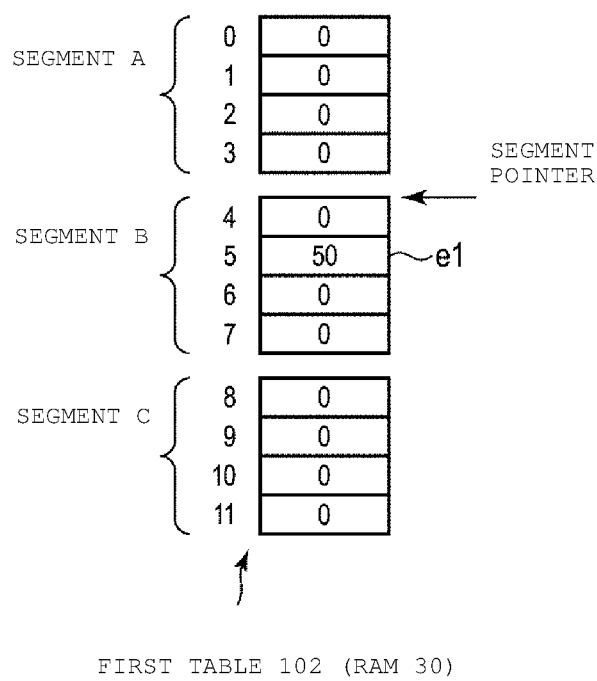
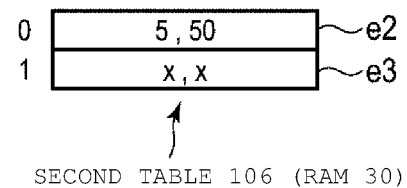

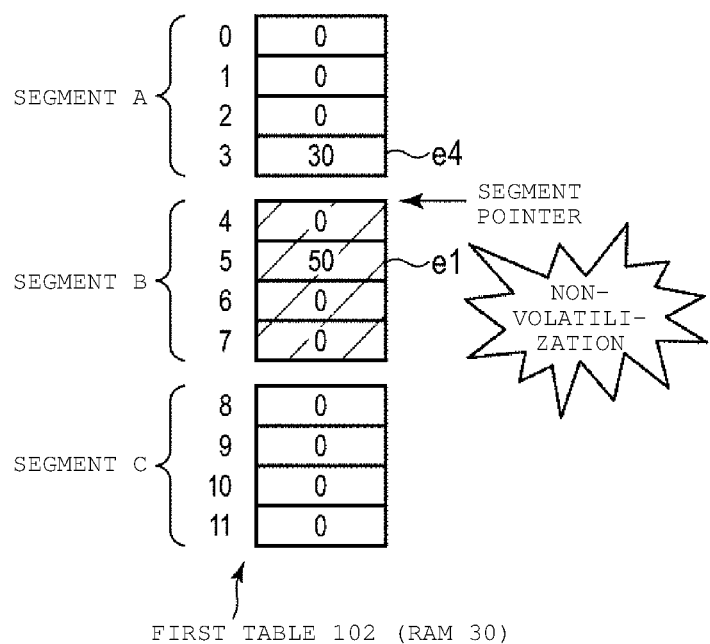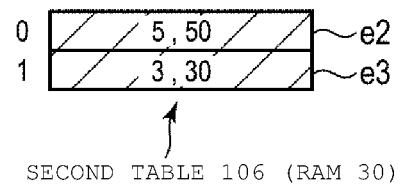

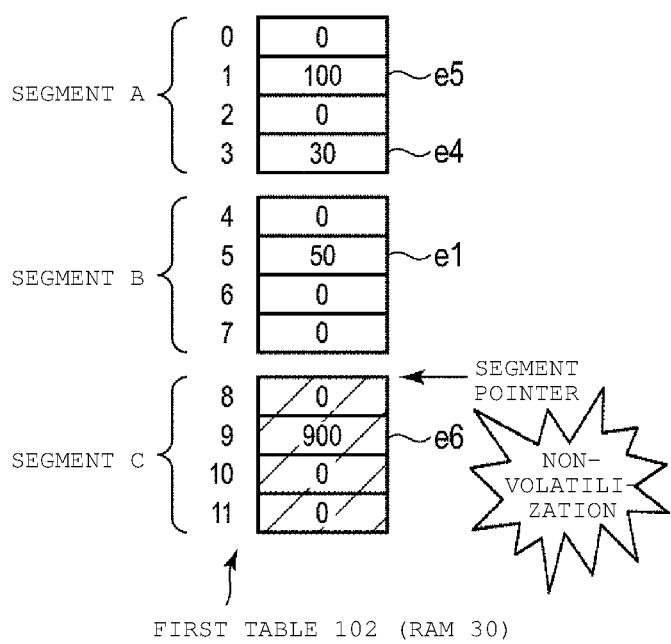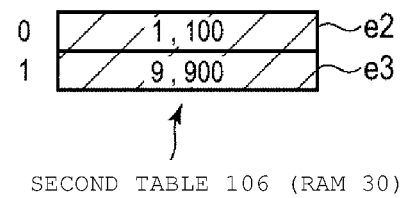
FIG. 8A
FIG. 8B

FIG. 10A

ORDER OF NON-VOLATILIZATION ↓

NON-VOLATILIZED SEGMENT A
| 0 | 0 |
| 1 | 100 |
| 2 | 0 |
| 3 | 30 |

NON-VOLATILIZED SECOND TABLE
| 0 | 1, 100 |
| 1 | 9, 900 |

NON-VOLATILIZED SEGMENT B
| 4 | 40 |
| 5 | 50 |
| 6 | 0 |
| 7 | 30 |

NON-VOLATILIZED SECOND TABLE
| 0 | 5, 50 |
| 1 | 2, 22 |

NON-VOLATILIZED SEGMENT C
| 8 | 88 |
| 9 | 900 |
| 10 | 0 |
| 11 | 30 |

NON-VOLATILIZED SECOND TABLE
| 0 | 8, 88 |
| 1 | 0, 1000 |

NON-VOLATILIZED SEGMENT A
| 0 | 1000 |
| 1 | 100 |
| 2 | 22 |
| 3 | 30 |

NON-VOLATILIZED SECOND TABLE
| 0 | 6, 6 |
| 1 | 9, 900 |

FIG. 10B

ORDER OF RESTORATION ↑ t3
| 0 | 1000 |
| 1 | 100 |
| 2 | 22 |
| 3 | 30 |
| 4 | 40 |
| 5 | 50 |
| 6 | 6 |
| 7 | 30 |
| 8 | 88 |
| 9 | 900 |
| 10 | 0 |
| 11 | 30 | t2
| 0 | 1000 |
| 1 | 100 |
| 2 | 22 |
| 3 | 30 |
| 4 | x |
| 5 | x |
| 6 | 6 |
| 7 | x |
| 8 | 88 |
| 9 | 900 |
| 10 | 0 |
| 11 | 30 | t1
| 0 | 1000 |
| 1 | 100 |
| 2 | 22 |
| 3 | 30 |
| 4 | x |
| 5 | x |
| 6 | 6 |
| 7 | x |
| 8 | x |
| 9 | 900 |
| 10 | x |
| 11 | x |

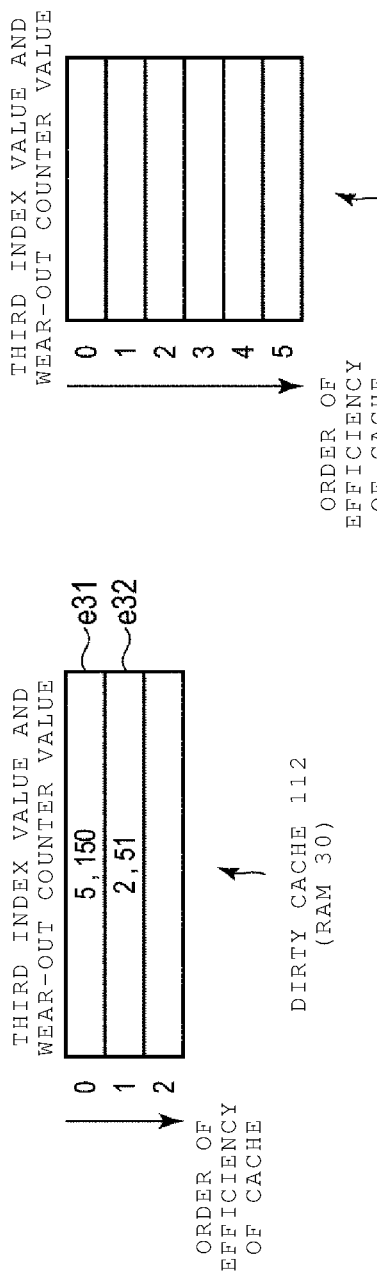
FIG. 11A
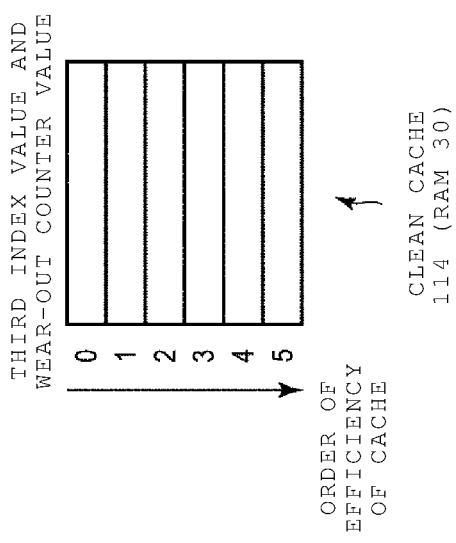
FIG. 11B
FIG. 11C

FIRST TABLE 202 (RAM 30)

SECOND TABLE 206 (RAM 30)

SEGMENT A
- 0: 150 ~e19
- 1: 50
- 2: 51 ~e11
- 3: 50

SEGMENT B
- 4: 50
- 5: 450 ~e12
- 6: 82 ~e20
- 7: 250 ~e21

SEGMENT C
- 8: 50
- 9: 53 ~e22
- 10: 50
- 11: 50

FIRST TABLE 202 (RAM 30)

FIRST INDEX VALUE AND DIFFERENCE VALUE
- 0: 5, 400 ~e13
- 1: 7, 200
- 2: 0, 100 ~e15  ~e14
- 3: 6, 32 ~e16
- 4: 9, 3 ~e17
- 5: 2, 1 ~e18

NON-VOLATILIZATION TARGET LOG

DESCENDING ORDER OF DIFFERENCE VALUES

SECOND TABLE 206 (RAM 30)

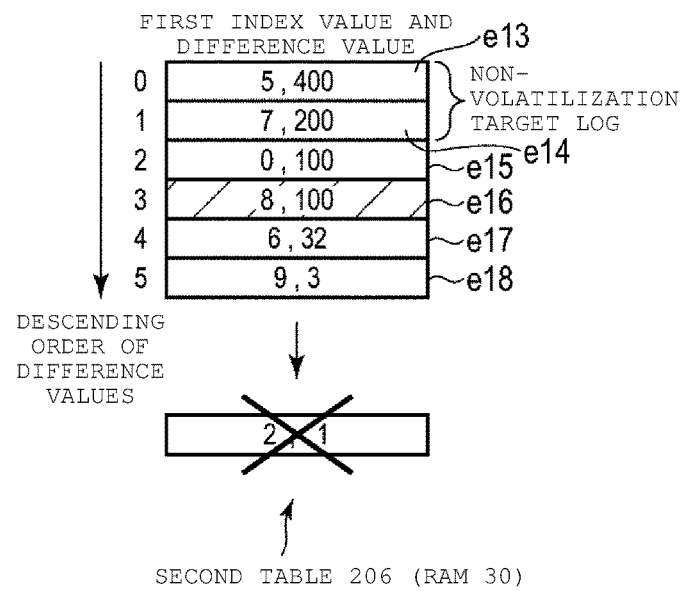

FIG. 16A

SEGMENT A
| 0 | 150 | ~e19 |
| 1 | 50 |  |
| 2 | 51 | ~e11 |
| 3 | 50 |  |

SEGMENT B
| 4 | 50 |  |
| 5 | 550 | ~e12 |
| 6 | 82 | ~e20 |
| 7 | 250 | ~e21 |

SEGMENT C
| 8 | 150 | ~e23 |
| 9 | 53 | ~e22 |
| 10 | 50 |  |
| 11 | 50 |  |

FIRST TABLE 202 (RAM 30)

FIG. 16B

FIRST INDEX VALUE AND DIFFERENCE VALUE

| 0 | 5, 500 | ~e13 } NON-VOLATILIZATION TARGET LOG |
| 1 | 7, 200 |  |
| 2 | 0, 100 | ~e15  e14 |
| 3 | 8, 100 | ~e16 |
| 4 | 6, 32 | ~e17 |
| 5 | 9, 3 | ~e18 |

↓ DESCENDING ORDER OF DIFFERENCE VALUES

SECOND TABLE 206 (RAM 30)

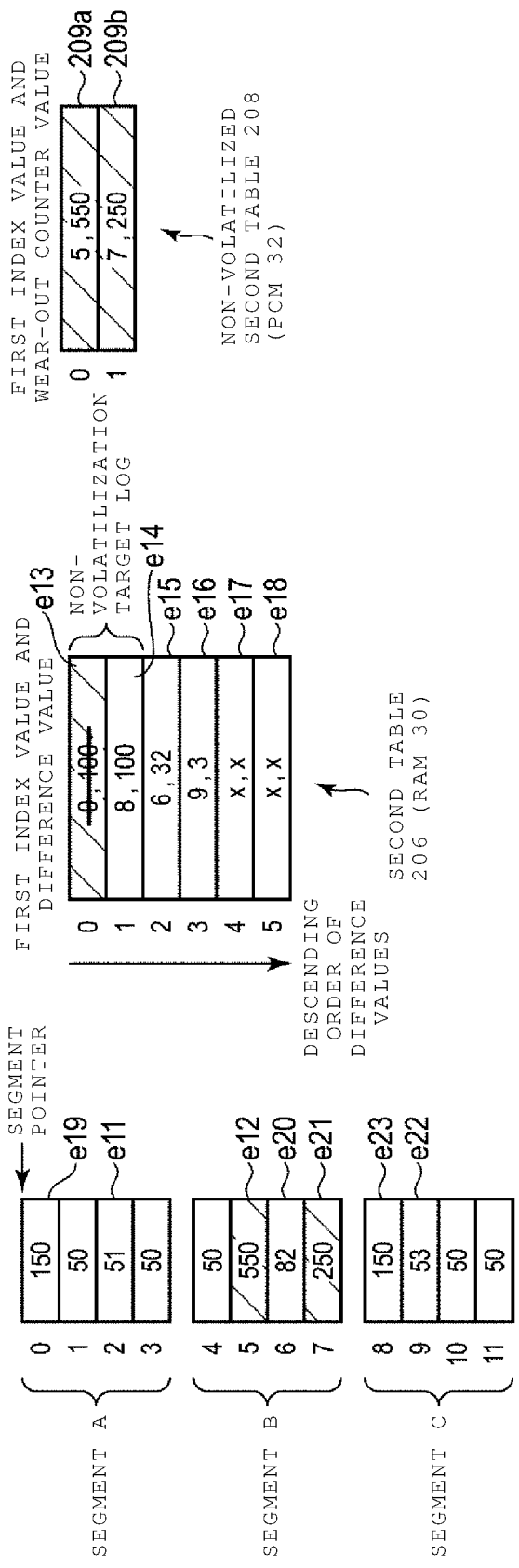
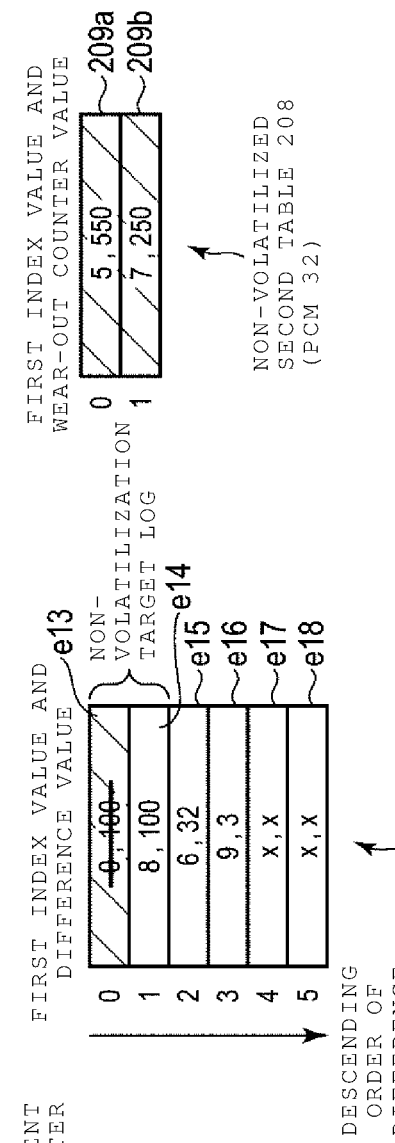
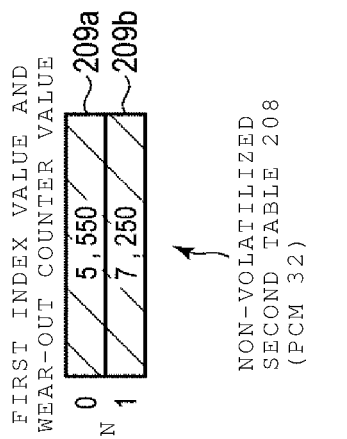

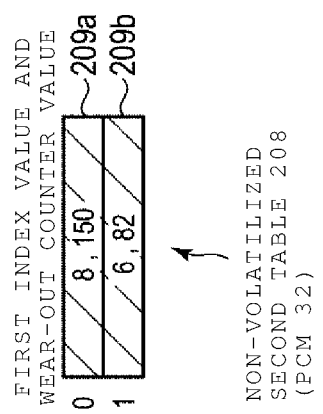
FIG. 18C
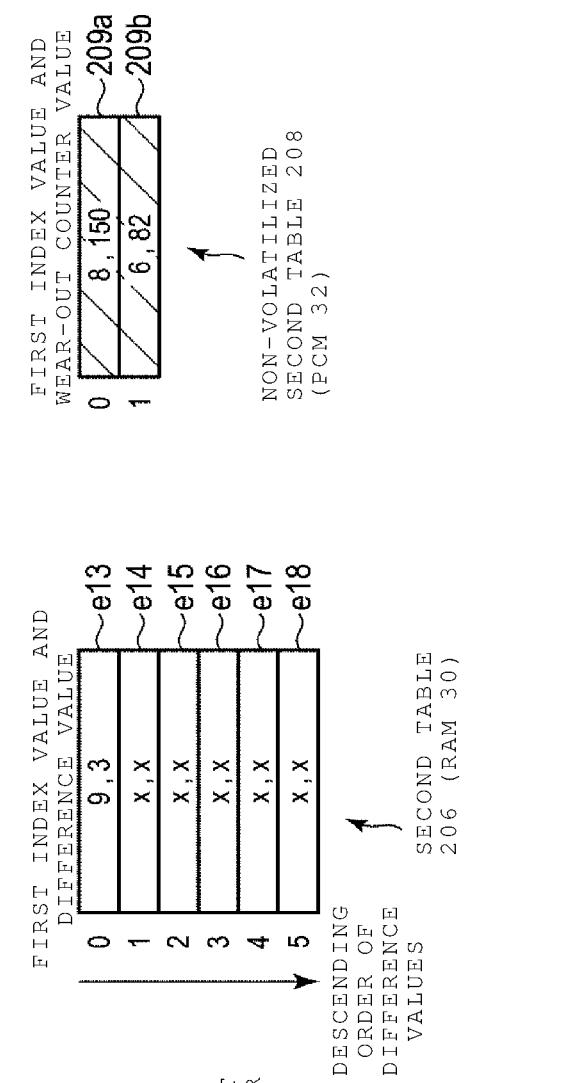
FIG. 18B
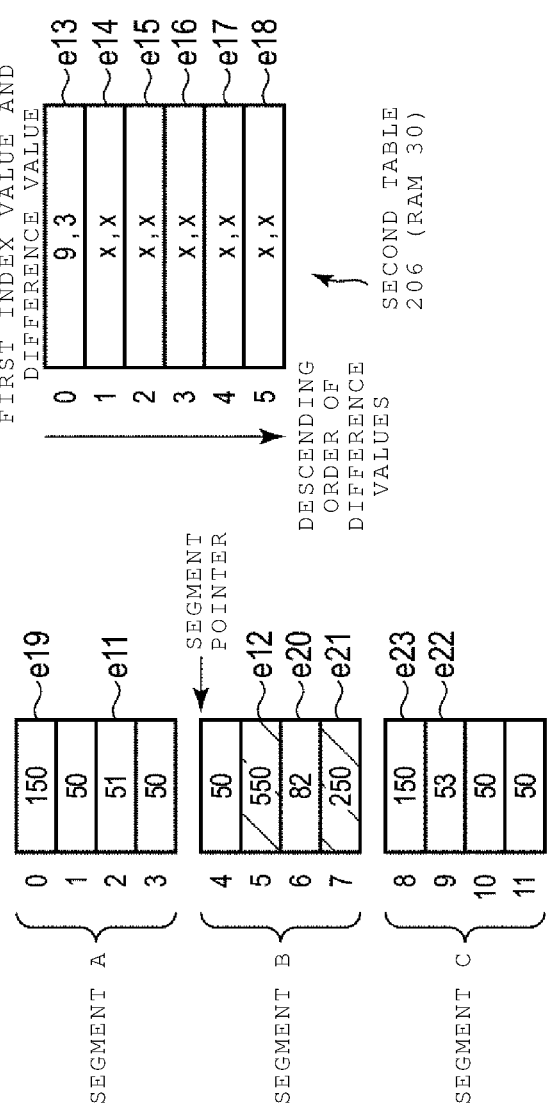
FIG. 18A
FIG. 18D

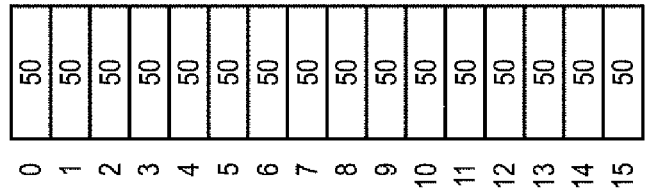
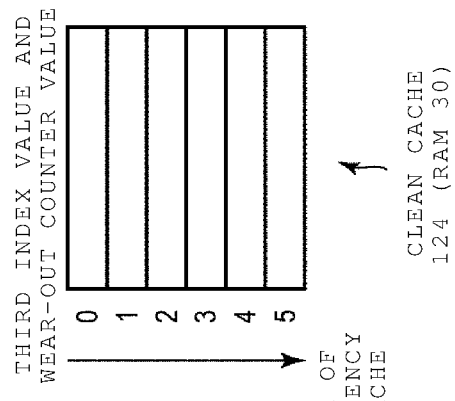
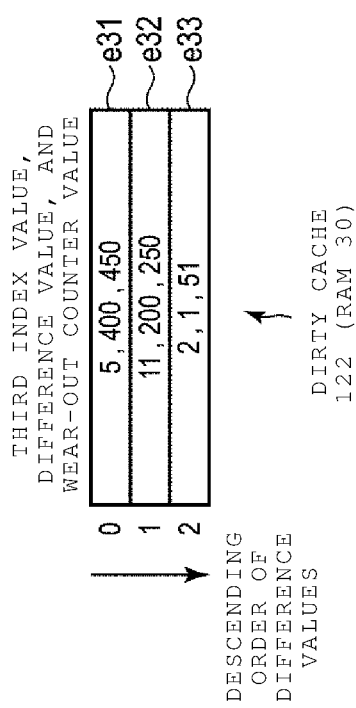

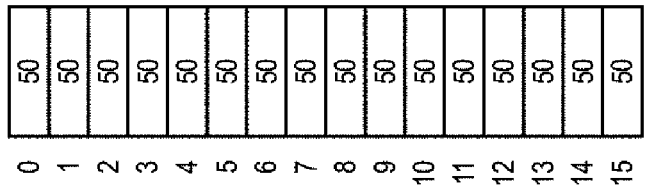
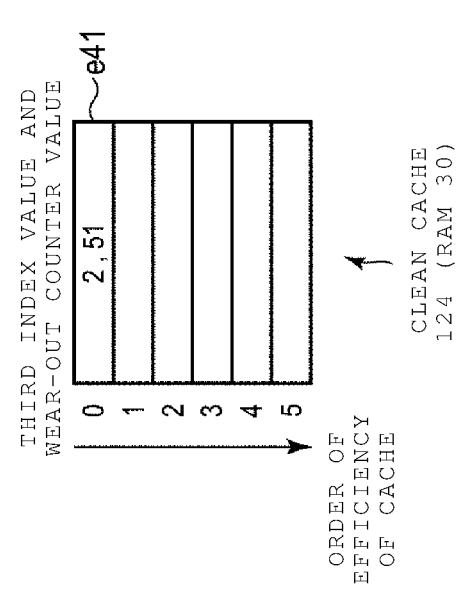
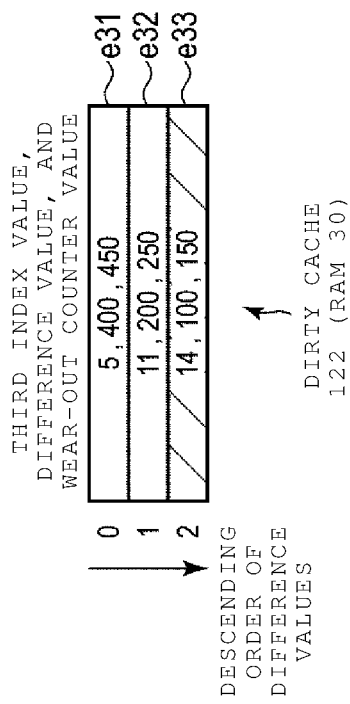

FIG. 23A

| | THIRD INDEX VALUE, DIFFERENCE VALUE, AND WEAR-OUT COUNTER VALUE |
|---|---|
| 0 | 11, 200, 250 — e31 |
| 1 | 14, 100, 150 — e32 |
| 2 | — e33 |

↓ DESCENDING ORDER OF DIFFERENCE VALUES

← DIRTY CACHE 122 (RAM 30)

FIG. 23B

| | THIRD INDEX VALUE AND WEAR-OUT COUNTER VALUE |
|---|---|
| 0 | 5, 550 — e41 |
| 1 | 2, 51 — e42 |
| 2 | |
| 3 | |
| 4 | |
| 5 | |

→ ORDER OF EFFICIENCY OF CACHE

← CLEAN CACHE 124 (RAM 30)

FIG. 23C

| | |
|---|---|
| 0 | 50 |
| 1 | 50 |
| 2 | 50 |
| 3 | 50 |
| 4 | 50 |
| 5 | 550 — e43 |
| 6 | 50 |
| 7 | 50 |
| 8 | 50 |
| 9 | 50 |
| 10 | 50 |
| 11 | 50 |
| 12 | 50 |
| 13 | 50 |
| 14 | 50 |
| 15 | 50 |

← NON-VOLATILIZED TABLE 126 (PCM 32)

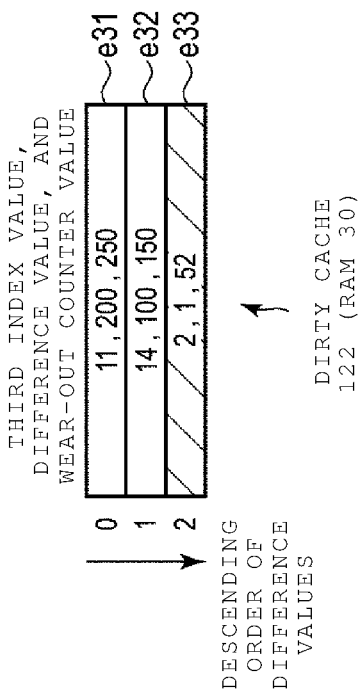
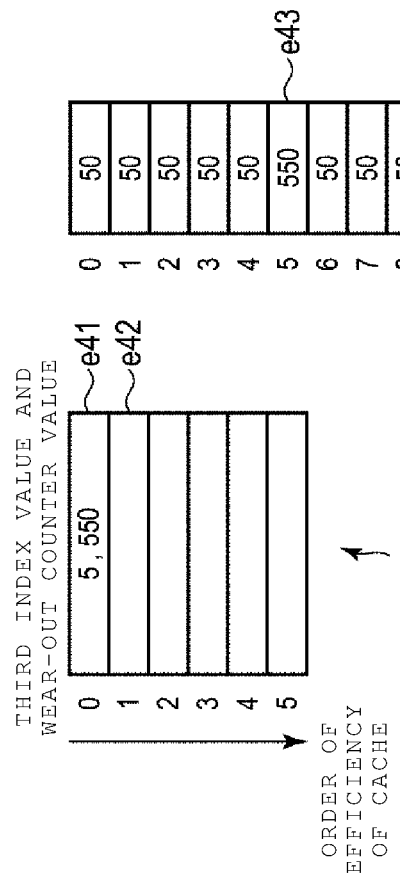
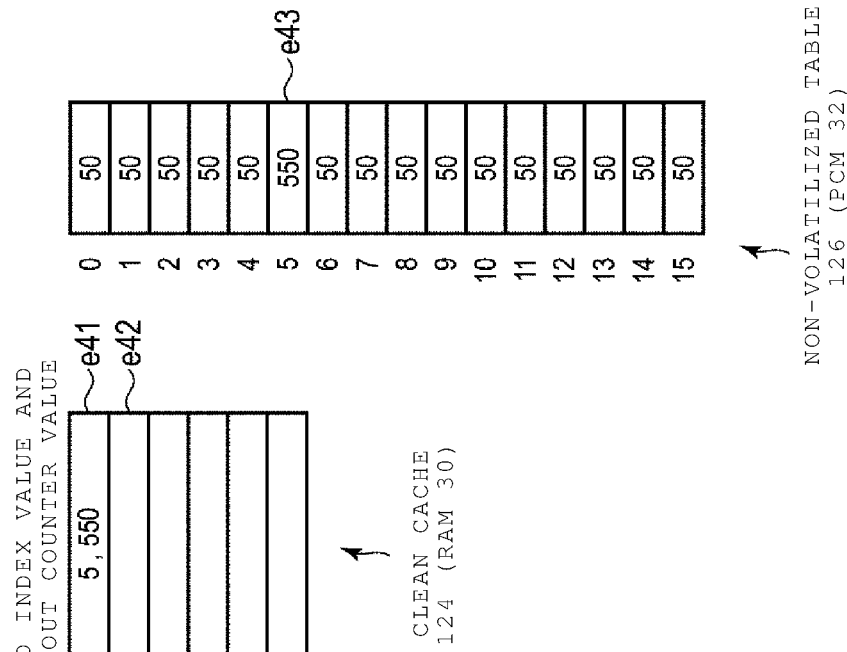
FIG. 24A
FIG. 24B
FIG. 24C

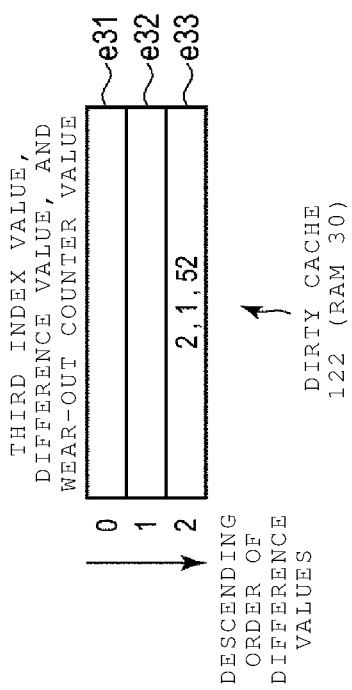
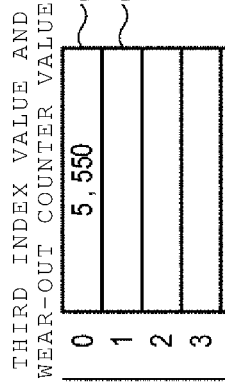
FIG. 25A
FIG. 25B
FIG. 25C

MEMORY SYSTEM MANAGING COUNTERS

CROSS-REFERENCE TO RELATED APPLICATION

This application is based upon and claims the benefit of priority from Japanese Patent Application No. 2022-104111, filed Jun. 29, 2022, the entire contents of which are incorporated herein by reference.

FIELD

Embodiments described herein relate generally to a memory system including a nonvolatile memory.

BACKGROUND

Memory systems including a rewritable nonvolatile memory have been developed. As the number of times of access to a read/write unit region in a rewritable nonvolatile memory increases, a nonvolatile memory element of the corresponding read/write unit region wears out, and the data storage capability deteriorates. The rewritable nonvolatile memory wears out not only as a result of write accesses but also as a result of read accesses. There is a type of memory that cannot be expected to recover from wear-out by write accesses, e.g., by performing a refresh write. In addition, there is also a type of memory having different degree of wear-out as a result of the write access relative to the read access. In such type of memory, for example, the degree of wear-out resulting from one write access is the same as the degree of wear-out resulting from 100 read accesses.

During a normal operation, a memory system counts the number of times of access per read/write unit region of a nonvolatile memory and stores the number of times of access as a degree of wear-out. The memory system converts a logical address designated from an external device to a physical address of the nonvolatile memory and determines a read destination or a write destination of data. The memory system performs a wear leveling process so that the degree of wear-out of all read/write unit regions of the nonvolatile memory become uniform. In the wear leveling process, the memory system changes mapping of logical addresses and physical addresses so as to change the read/write positions of data.

During the normal operation, the memory system stores wear-out information including the degree of wear-out, per read/write unit region in a volatile memory and refers to or updates the wear-out information. If a shut-down command is received from the external device, the memory system reads the wear-out information from the volatile memory, non-volatilizes (that is, writes into the nonvolatile memory) the wear-out information, and shuts down. At the time of starting up, the memory system reads the wear-out information from the nonvolatile memory and stores the wear-out information in the volatile memory.

The wear-out information of all read/write unit regions are stored in the nonvolatile memory. However, depending on the capacity of the volatile memory, only a part of the wear-out information of the read/write unit regions can be stored in the volatile memory. When a region of the nonvolatile memory is accessed and this region is not one of the read/write unit regions for which wear-out information is stored in the volatile memory, the memory system is required to perform a purging process on the wear-out information stored in the volatile memory. This purging process is, for example, a purging process that is typically carried out at the time of a cache miss in a conventional memory having a hierarchical structure. As a result of this purging process, all the wear-out information are non-volatilized into the nonvolatile memory. In addition, at the time of the shut-down process, all the wear-out information stored in the volatile memory are non-volatilized into the nonvolatile memory. When the wear-out information is updated during the normal operation, the memory system appropriately non-volatilizes the wear-out information that has been updated, into the nonvolatile memory.

Generally, in case of a random access, many read/write unit regions are accessed, and thus the two non-volatilization processes described above are likely to be performed. In addition, in a memory system that employs a nonvolatile memory that is not expected to have a refresh effect by writing, the wear-out information is updated in case of a read access as well as a write access, and thus the non-volatilization process is more likely to be performed therein than in a memory system that employs nonvolatile memory that is expected to have the refresh effect by writing.

The nonvolatile memory wears out not only by data read/write accesses by an external device, but also by non-volatilization of the wear-out information caused by the accesses by the external device. Here, when the degree of wear-out is different between the write access and the read access, if the wear-out information is non-volatilized for each access for which the wear-out degree is small (e.g., read access), an increase in the wear-out resulting from the non-volatilization of the wear-out information becomes greater than the increase in the wear-out resulting from data reading. As a result, the lifetime of the nonvolatile memory is reduced.

DESCRIPTION OF THE DRAWINGS

FIGS. 4A and 4B are diagrams illustrating an example of a data structure of wear-out information used in a segment/log method according to the embodiment.

FIGS. 5A and 5B are diagrams illustrating an example of non-volatilization of segments and logs in the segment/log method according to the embodiment.

FIGS. 6A and 6B are diagrams illustrating an example of non-volatilization of segments and logs in the segment/log method according to the embodiment.

FIGS. 8A and 8B are diagrams illustrating an example of non-volatilization of segments and logs in the segment/log method according to the embodiment.

FIGS. 10A and 10B are diagrams illustrating an example of restoration of a table in the segment/log method according to the embodiment.

FIGS. 11A to 11C are diagrams illustrating an example of a data structure of wear-out information used in a partial-or-whole cache method according to the embodiment.

FIGS. 14A and 14B are diagrams illustrating an example of the non-volatilization in the segment/log/difference method according to the embodiment.

FIGS. 15A and 15B are diagrams illustrating an example of the non-volatilization in the segment/log/difference method according to the embodiment.

FIGS. 16A and 16B are diagrams illustrating an example of the non-volatilization in the segment/log/difference method according to the embodiment.

FIGS. 17A to 17D are diagrams illustrating an example of the non-volatilization in the segment/log/difference method according to the embodiment.

FIGS. 18A to 18D are diagrams illustrating an example of the non-volatilization in the segment/log/difference method according to the embodiment.

FIGS. 21A to 21C are diagrams illustrating an example of the non-volatilization in the partial-or-whole cache/difference method according to the embodiment.

FIGS. 22A to 22C are diagrams illustrating an example of the non-volatilization in the partial-or-whole cache/difference method according to the embodiment.

FIGS. 23A to 23C are diagrams illustrating an example of the non-volatilization in the partial-or-whole cache/difference method according to the embodiment.

FIGS. 24A to 24C are diagrams illustrating an example of the non-volatilization in the partial-or-whole cache/difference method according to the embodiment.

FIGS. 25A to 25C are diagrams illustrating an example of the non-volatilization in the partial-or-whole cache/difference method according to the embodiment.

DETAILED DESCRIPTION

Figure 1:
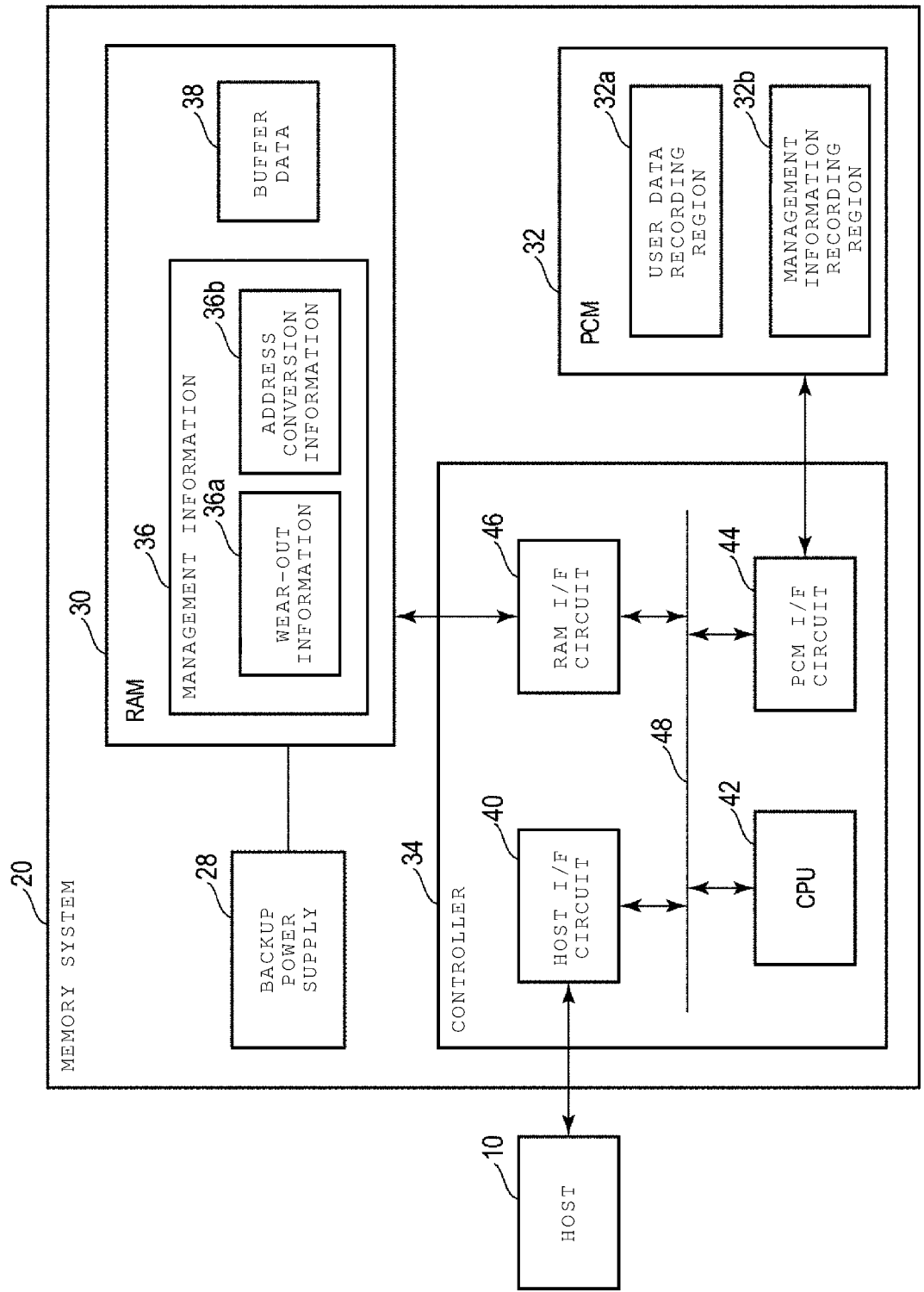
FIG. 1 is a block diagram illustrating an example of an information processing system including a memory system according to an embodiment.

Embodiments provide a memory system that can reduce wear-out of a nonvolatile memory.

In general, according to one embodiment, a memory system includes a nonvolatile memory that includes a plurality of regions; a volatile memory; and a controller that is connected to the nonvolatile memory and the volatile memory. The controller is configured to store in the volatile memory a plurality of first counter values each indicating the number of times each of the plurality of regions has been accessed and a plurality of second counter values respectively corresponding to the plurality of first counter values, and write the first counter value of a first region of the plurality of regions to the nonvolatile memory in response to the second counter value of the first region being equal to or more than a threshold value.

Hereinafter, the embodiment is described with reference to the drawings. The following description provides examples of devices and methods for embodying the technical idea of the embodiment, and the technical idea of the embodiment is not limited to structures, shapes, arrangements, materials, or the like of the components described below. Modifications that would be easily conceived by those skilled in the art are naturally provided in the scope of the disclosure. In order to clarify the description more, in the drawings, the size, thickness, planar dimension, shape, or the like of each element may be changed from actual ones and schematically represented. Drawings may include elements having dimensional relationships and ratios that may be different from figure-to-figure. In the drawings, corresponding elements are denoted by the same reference numerals, and duplicate descriptions may be omitted. Some elements may be given a plurality of names, but these names are merely examples, and other names may be given to these elements. In addition, it should be understood that other names may be given to the elements which are not given a plurality of names. In the following description, "connection" may include not only direct connection but also connection via other elements.

Hereinafter, an embodiment is specifically described with reference to the drawings.

System Configuration

FIG. 1 is a block diagram illustrating an example of a configuration of an information processing system including a memory system 20 according to the embodiment. The information processing system includes the memory system 20 and a host 10. The host 10 is an information processing device. The host 10 is an external device that accesses the memory system 20. The host 10 may be a server (e.g., storage server) that stores a large amount of various items of data in the memory system 20 or may be a personal computer. The memory system 20 may be used as storage for host 10. In addition, the memory system 20 may be used as a memory (e.g., main memory) of the host 10. The memory system 20 may be built in the host 10, or may be provided outside the host 10 and be connected to the host 10 via a cable or network by wire or wirelessly.

The memory system 20 includes a backup power supply 28, a volatile memory 30, a nonvolatile memory 32, and a controller 34. The controller 34 writes data to the volatile memory and the nonvolatile memory 32 and reads data from the volatile memory 30 and the nonvolatile memory 32.

As a nonvolatile memory, both non-rewritable memory and rewritable memory are known. With respect to the non-rewritable memory, it is required to perform a data writing process after a data erasing process is performed in an erasure unit region that is larger than a read/write unit region. With respect to the rewritable memory, the erasing process is not required, and data can be rewritten in the read/write unit region. Examples of the non-rewritable memory include a flash memory. Examples of the rewritable memory include a phase change memory (PCM). The PCM is suitable as a nonvolatile memory used in a storage class memory (SCM) that expands a main memory of the host.

The flash memory determines values of bits of data depending on amounts of charges stored in a memory element. As the flash memory is read, the charges stored in the memory element are gradually discharged, and eventually correct values of the bits cannot be determined. However, this wear-out from reading may be recovered by injecting a correct amount of charges in the memory element again by refresh writing.

Meanwhile, the PCM determines values of the bits of data by changing the structure of memory elements. The wear-out is in the form of stresses and stresses are accumulated in the memory element even by reading, and the wear-out accumulated in the memory element by reading cannot be recovered by refresh writing. In this manner, the PCM accumulates the wear-out not only as a result of the write access but also as a result of the read access. Accordingly, for performing the wear leveling process, both the wear-out by the write access and the wear-out by the read access are required to be managed.

According to the present embodiment, the nonvolatile memory 32 is a rewritable memory. In the following description, the nonvolatile memory 32 is referred to as PCM 32.

The volatile memory 30 is, for example, a dynamic random access memory (DRAM). The volatile memory 30 may be a static RAM (SRAM) that can be accessed faster than a DRAM. In the following description, the volatile memory 30 is referred to as RAM 30. The RAM 30 may be provided outside the controller 34 and also may be provided in the controller 34.

The RAM 30 stores management information 36 and buffer data 38. Examples of the management information 36 include wear-out information 36a and address conversion information 36b, but are not limited to these. The management information 36 may include other information. The management information 36 is written to the PCM 32 at an appropriate timing during a normal operation and thus non-volatilized. The non-volatilization may be performed a plurality of times during the normal operation.

The wear-out information 36a includes information indicating the degree of wear-out of the PCM 32. The wear-out information 36a includes a wear-out counter for tracking the degree of wear-out. The wear-out counter is provided for each read/write unit region of the PCM 32. When access to the PCM 32 occurs, the wear-out counter value is updated. The wear-out counter value corresponds to the degree of wear-out. The read/write unit region of the PCM 32 has a smaller capacity than the read/write unit region of the flash memory and is close to, for example, a unit size of memory access of a CPU in the host 10. A memory capacity required for storing the wear-out counter values of all the read/write unit regions of the PCM 32, each of which is small and accessed independently, becomes very large.

In the following description, the read/write unit region of the PCM 32 is referred to as a recording region.

The degree of wear-out resulting from one read access to the PCM 32 is different from the degree of wear-out resulting from one write access. For example, the degree of wear-out resulting from one write access is the same as the degree of wear-out resulting from 100 read accesses. A first wear-out counter value for the read accesses and a second wear-out counter value for the write accesses are provided for tracking the wear-out. The second wear-out counter value is, for example, multiplied by 100 to be converted to a counter value for read accesses. Also, the sum of the second wear-out counter value after the conversion and the first wear-out counter value is considered as the wear-out counter value. The wear-out counter value is updated according to access to the PCM 32.

The address conversion information 36b indicates a correspondence relationship between a logical address and an address (also referred to as a physical address) of the PCM 32. The host 10 transmits a host write command or a host read command to the memory system 20. The host write command includes a logical address designated by the host 10 and write data. The host read command includes a logical address designated by the host 10. The controller 34 that receives the host write command or the host read command converts the logical address to the physical address with reference to the address conversion information 36b. The controller 34 accesses a read/write unit region of the PCM 32 specified by the physical address acquired by conversion. Since the read/write unit region of the PCM 32 is specified by the physical address, the wear-out information 36a includes a wear-out counter value for each physical address of the PCM 32.

The buffer data 38 is temporarily stored data. The buffer data 38 includes read data read from the PCM 32 and write data to be written to the PCM 32.

The PCM 32 includes a user data recording region 32a and a management information recording region 32b. The user data recording region 32a is a region where the data received in accordance with the host write command from the host 10 is stored. The management information recording region 32b is a region where the management information 36 non-volatilized from the RAM 30 is stored.

The controller 34 may be implemented by a circuit such as a system-on-a-chip (SoC). The function of each unit of the controller 34 may be implemented by dedicated hardware, a processor executing a program, or a combination thereof.

The controller 34 includes a host interface (host I/F) circuit 40, a CPU 42, a nonvolatile memory interface (PCM I/F) circuit 44, and a volatile memory interface (RAM I/F) circuit 46. The host I/F circuit 40, the CPU 42, the PCM I/F circuit 44, and the RAM I/F circuit 46 are connected to a bus line 48. The CPU 42 provides various functions by executing firmware stored in the PCM 32. Examples of various functions include non-volatilization of the management information 36 stored in the RAM 30.

The host 10 is electrically connected to the host I/F circuit 40, the PCM 32 is electrically connected to the PCM I/F circuit 44, and the RAM 30 is electrically connected to the RAM I/F circuit 46.

Figure 2:
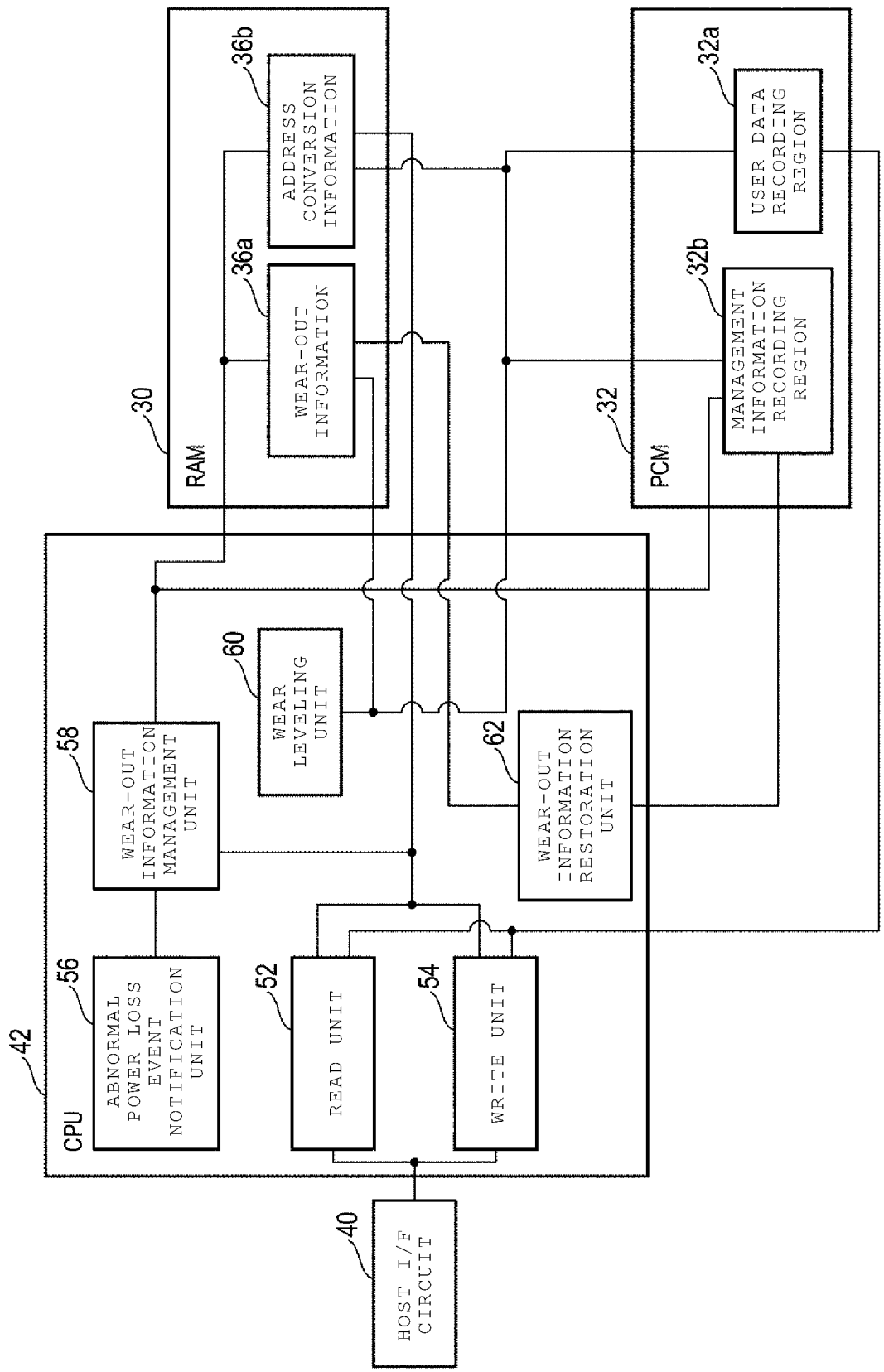
FIG. 2 is a functional block diagram illustrating an example of a function of a CPU in a controller of the memory system according to the embodiment.

FIG. 2 is a functional block diagram illustrating an example of a function of the CPU 42 in the controller 34 according to the embodiment. FIG. 2 illustrates functions relating to a non-volatilization process and a restoration process of the management information that are examples of the functions of the CPU 42. In FIG. 2, as examples of the non-volatilization process and the restoration process of the management information 36, the non-volatilization process and the restoration process of the wear-out information 36a are described. The non-volatilization process and the restoration process as described herein for the wear-out information 36a can be applied to the non-volatilization process and the restoration process of the other management information 36 (for example, the address conversion information 36b) in the same manner.

The CPU 42 functions as a read unit 52, a write unit 54, an abnormal power loss event notification unit 56, a wear-out information management unit 58, a wear leveling unit 60, and a wear-out information restoration unit 62, by executing firmware.

The read unit 52 and the write unit 54 are connected to the host I/F circuit 40. The host I/F circuit 40 receives a host read command, a host write command, and a shut-down command transmitted from the host 10. The host I/F circuit 40 transmits the host read command to the read unit 52. The host I/F circuit 40 transmits the host write command to the write unit 54. The host I/F circuit 40 transmits the shut-down command to the wear-out information management unit 58.

The read unit 52 is connected to the wear-out information management unit 58. The read unit 52 is connected to the RAM 30 via the RAM I/F circuit 46 (not illustrated in FIG. 2). The read unit 52 is connected to the PCM 32 via the PCM I/F circuit 44 (not illustrated in FIG. 2). The read unit 52 acquires the physical address corresponding to the logical address provided in the host read command with reference to the address conversion information 36*b*. The read unit 52 reads data from a recording region of the user data recording region 32*a* having the acquired physical address. The read unit 52 stores the read data in the RAM 30 as the buffer data 38 and transmits the read data to the host 10. When the data is read from the user data recording region 32*a*, the read unit 52 notifies the wear-out information management unit 58 of the physical address of the read recording region.

The write unit 54 is connected to the wear-out information management unit 58. The write unit 54 is connected to the RAM 30 via the RAM I/F circuit 46. The write unit 54 is connected to the PCM 32 via the PCM I/F circuit 44. The write unit 54 acquires the physical address corresponding to the logical address in the host write command with reference to the address conversion information 36*b*. The write unit 54 writes write data in the host write command to a recording region of the user data recording region 32*a* having the acquired physical address. The write unit 54 stores the write data as the buffer data 38 in the RAM 30 and writes the write data to the PCM 32. When the data is written to the user data recording region 32*a*, the write unit 54 notifies the wear-out information management unit 58 of the physical address of the written recording region.

The wear-out information management unit 58 is connected to the RAM 30 via the RAM I/F circuit 46. The wear-out information management unit 58 is connected to the PCM 32 via the PCM I/F circuit 44. The wear-out information management unit 58 increases the wear-out counter value corresponding to the physical address notified by the read unit 52 or the write unit 54, that is, updates the wear-out information 36*a*.

Power is supplied from the host 10 to the memory system 20. The controller 34 supplies power to each unit in the memory system 20 in response to a power-on command from the host 10. When a shut-down command is received from the host 10, the controller 34 writes the management information 36 or the buffer data 38 stored in the RAM 30 to the PCM 32 to be non-volatilized. After the non-volatilization, the controller 34 stops the supply of the power to each unit and responds to the host 10 that the host 10 may shut down the memory system 20.

The abnormal power loss event notification unit 56 detects an unintended power interruption event. The unintended power interruption event is an event such as power failure, and is an event of stopping the power supply without a shut-down command from the host 10. Hereinafter, the unintended power interruption is referred to as abnormal power loss. The abnormal power loss event notification unit 56 transmits an abnormal power loss event notification to the wear-out information management unit 58. The memory system 20 includes a function referred to as power loss protection (PLP) of preventing data stored in the RAM 30 from being not lost when the abnormal power loss event is notified. The memory system 20 includes the backup power supply 28 for the PLP. Examples of the backup power supply 28 include a capacitor.

When the shut-down command or the abnormal power loss event notification is received, the wear-out information management unit 58 reads the wear-out information 36*a* from the RAM 30 and writes the wear-out information 36*a* to the management information recording region 32*b*. The data size that can be non-volatilized by the PLP is limited by the power supply capability of the backup power supply 28. Therefore, when the abnormal power loss event is notified, all the wear-out information 36*a* cannot be non-volatilized in some cases.

The wear leveling unit 60 is connected to the RAM 30 via the RAM I/F circuit 46. The wear leveling unit 60 is connected to the PCM 32 via the PCM I/F circuit 44. The wear leveling is a process of switching (or, exchanging) data between read/write unit regions so that the degrees of wear-out of all the read/write unit regions of the user data recording region 32*a* of the PCM 32 become uniform. All the read/write unit regions of the management information recording region 32*b* of the PCM 32 may be also provided as a wear leveling target. The wear leveling unit 60 determines the physical address of a read/write unit region determined to have a high degree of wear-out based on a predetermined criterion, as the physical address of an exchange source. The wear leveling unit 60 determines the physical address of a read/write unit region determined to have a low degree of wear-out based on the predetermined criterion, as the physical address of an exchange destination. The wear leveling unit 60 determines the degree of wear-out of the read/write unit region, for example, with reference to the wear-out counter value of the wear-out information 36*a*. The wear leveling unit 60 reads data from the physical address of the exchange source and the physical address of the exchange destination in the user data recording region 32*a*. The wear leveling unit 60 switches the data recording positions by respectively writing the read data to the physical addresses of the exchange source and the exchange destination. The wear leveling unit 60 updates the address conversion information 36*b* according to the switching of the data recording positions. Accordingly, in the user data recording region 32*a*, the read/write unit region having the high degree of wear-out stores data having a low update frequency, and the read/write unit region having the low degree of wear-out stores data having a high update frequency. Thereafter, if access by the host write command or the host read command continues in the same manner as before the wear leveling, the degrees of wear-out between the exchanged read/write unit regions are expected to be made more uniform. Therefore, the degrees of wear-out of all regions of the user data recording region 32*a* are expected to made more uniform.

The wear leveling unit 60 writes the updated address conversion information 36*b* to the management information recording region 32*b* at an appropriate timing to be non-volatilized.

The wear-out information restoration unit 62 is connected to the RAM 30 via the RAM I/F circuit 46. The wear-out information restoration unit 62 is connected to the PCM 32 via the PCM I/F circuit 44. When to the memory system 20 starts up, the wear-out information restoration unit 62 restores the management information stored in the management information recording region 32*b* according to a predetermined procedure. The wear-out information restoration unit 62 writes the restoration result as the management information 36, to the RAM 30.

Management Method of Management Information

A method of managing management information is described. The controller 34 requires the management information 36 for access to the PCM 32. The management information 36 includes various kinds of information such as the wear-out information 36*a* or the address conversion information 36*b*. The management information 36 differs in size, update frequency, importance, and the like for each type, and thus it is required to employ an appropriate management method. Hereinafter, management relating to the non-volatilization of the wear-out information 36a in the management information 36 is described. First, several methods relating to the non-volatilization of the wear-out information 36a, which is the basis of the present embodiment, are described.

PLP Batch Method (Basic Method)

In case of using a PLP batch method, when the memory system 20 starts up, the wear-out information restoration unit 62 restores the wear-out information 36a for all the read/write unit regions stored in the management information recording region 32b and stores the restoration result to the RAM 30. In addition, when a shut-down command or abnormal power loss notification is received, the wear-out information management unit 58 writes the wear-out information 36a for all the read/write unit regions stored in the RAM 30 to the management information recording region 32b to be non-volatilized. In this method, as illustrated in FIGS. 1 and 2, the recording region of the PCM 32 is divided into the user data recording region 32a and the management information recording region 32b. The management information recording region 32b is a region that is not subject to wear leveling. The management information recording region 32b is a region that can be accessed without address conversion.

When the capacity of the management information recording region 32b is larger than that of the wear-out information 36a, and a position in the management information recording region 32b to which the wear-out information 36a is written is shifted each time non-volatilization of the wear-out information 36a is carried out, the degree of wear-out of all the read/write unit regions of the management information recording region 32b can be made uniform without performing the wear leveling. For example, if the management information recording region 32b is configured as a ring buffer, the wear-out information 36a is cyclically written to the ring buffer. Accordingly, the degree of wear-out of the management information recording region 32b is made uniform. If the degree of wear-out resulting from reading and writing by the estimated number of non-volatilization processes during the product lifetime of the memory system 20 is sufficiently smaller than the endurance, the capacity of the management information recording region 32b allocated to the PCM 32 may be the same as the size of the wear-out information 36a. The endurance is the upper limit (for example, the upper limit value of the wear-out counter value) of the degree of wear-out in which the storage capability of the PCM 32 can be equal to or more than a certain level. The endurance can be determined based on the number of times of read access and the number of times of write access converted into the number of times of read access.

Figure 3A:
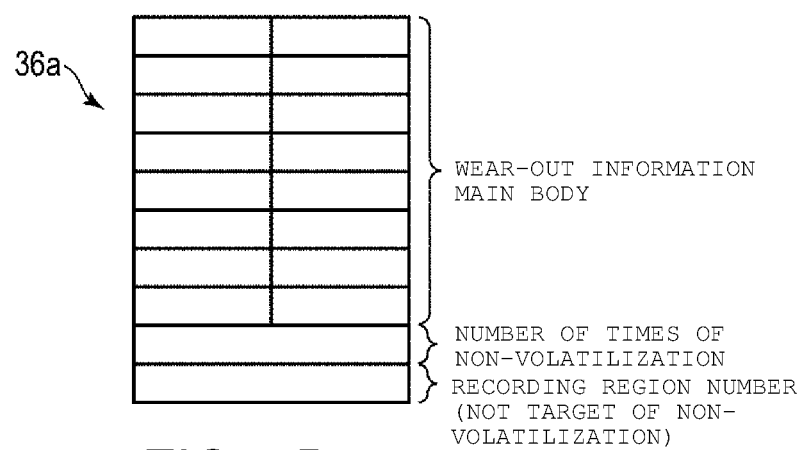
FIGS. 3A and 3B are diagrams illustrating an example of a data structure of wear-out information used in a power loss protection (PLP) batch method according to the embodiment.
Figure 3B:
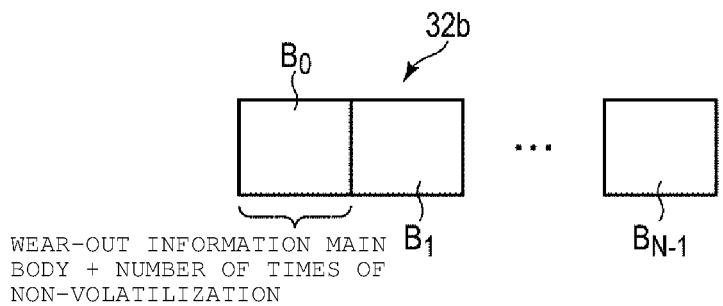

FIGS. 3A and 3B are diagrams illustrating an example of a data structure of the wear-out information 36a in the PLP batch method. FIG. 3A illustrates an example of a data structure of the wear-out information 36a stored in the RAM 30. The wear-out information 36a includes a "wear-out information main body", "the number of times of non-volatilization", and a "recording region identifier". Examples of the "recording region identifier" include a "recording region number", but the "recording region identifier" is not limited thereto. In the following description, an example of the "recording region identifier" is the "recording region number".

The "wear-out information main body" is wear-out counter values of all the read/write unit regions in the user data recording region 32a. As described below, the wear leveling process of the management information recording region 32b is not required. "The number of times of non-volatilization" is the number of times of non-volatilization of the wear-out information main body. The "recording region number" refers to an identification number of a data block. For example, when the number of data blocks is N, a value of 0 to N−1 may be stored in the "recording region number". Note that the "recording region number" is not subject to non-volatilization.

FIG. 3B is an example of a data structure of non-volatilized wear-out information stored in the management information recording region 32b. The management information recording region 32b stores N data blocks $B_0, B_1, \ldots,$ and $B_{N-1}$. In one time of non-volatilization, the "wear-out information main body" and the "number of times of non-volatilization" are written to the management information recording region 32b (into any one of the data blocks $B_0, B_1, \ldots$ and $B_{N-1}$). Here, N is obtained from a ratio (rounded up to the whole number) between a degree of wear-out resulting from reading and writing by the power cycle (that is, the power supply on and off) of the estimated number of times during the product lifetime, and an endurance.

When the memory system 20 starts up, the wear-out information restoration unit 62 restores the latest non-volatilized "wear-out information main body" and stores the restored "wear-out information main body" to the RAM 30. For this purpose, the wear-out information restoration unit 62 reads the "number of times of non-volatilization" in all the data blocks $B_0, B_1, \ldots,$ and $B_{N-1}$ stored in the management information recording region 32b, and reads a data block (the "wear-out information main body" and the "number of times of non-volatilization") having the largest "number of times of non-volatilization" from the management information recording region 32b. The wear-out information restoration unit 62 stores the "wear-out information main body" and the "number of times of non-volatilization" provided in the read data block, to the RAM 30 as the wear-out information 36a.

The wear-out information restoration unit 62 increments and updates the "number of times of non-volatilization" of the wear-out information 36a.

The wear-out information restoration unit 62 calculates the recording region number of the management information recording region 32b to which the wear-out information 36a is to be written during the next non-volatilization according to the following equation:

New Recording Region Number=a mod b, where
a=(Recording Region Number of Loading Source+1) and b=(The Number of Data Blocks).

The recording region number of the loading source is the recording region number of a recording region from which a "wear-out information main body" and "the number of times of non-volatilization" are read when the memory system 20 starts up, that is, the recording region number of a recording region in which a data block having the largest "number of times of non-volatilization" is stored. The number of data blocks is N. The wear-out information restoration unit 62 stores the calculated new recording region number in the "recording region number" of the wear-out information 36a.

In this manner, by changing the write destination of the wear-out information 36a in the management information recording region 32b each time of the non-volatilization similar to writes into a ring buffer, without performing the wear leveling by the wear leveling unit 60, the degree of wear-out of each read/write unit region of the management information recording region 32b is made uniform.

During the normal operation, the wear-out information management unit 58 updates only the wear-out information 36a stored in the RAM 30 according to a read access and a write access to the PCM 32 and does not non-volatilize the updated wear-out information 36a.

When the shut-down command or the abnormal power loss event notification is received, the wear-out information management unit 58 writes "wear-out information main body" and the "number of times of non-volatilization" of the wear-out information 36a stored in the RAM to a recording region of the management information recording region 32b indicated by the "recording region number" to be non-volatilized.

As described with reference to FIG. 3B, the management information recording region 32b of the PCM 32 requires a recording region for storing N data blocks in accordance with the endurance. The PLP batch method is performed based on an assumption that all the wear-out information 36a can be non-volatilized by the PLP. During the normal operation, the wear-out information 36a stored in the RAM 30 is only updated but is not non-volatilized, and thus an additional access to the PCM 32 does not occur. Therefore, the management cost of the wear-out information 36a during the normal operation in the PLP batch method is very low. Meanwhile, the PLP batch method cannot be applied to the wear-out information 36a having a large size that cannot be non-volatilized by the PLP. As a result, there is a trade-off between management cost and the power supply capability of the backup power supply 28.

Segment/Log Method (Basic Method)

In the segment/log method, in the same manner as in the PLP batch method, the management information recording region 32b is not subject to the address conversion and wear leveling. Also, in this method, as illustrated in FIGS. 1 and 2, the recording region of the PCM 32 is divided into the user data recording region 32a and the management information recording region 32b. In this method, the wear-out information 36a includes a wear-out counter value and a log.

FIGS. 4A and 4B are diagrams illustrating an example of a data structure of the wear-out information 36a stored in the RAM 30 in the segment/log basic method. The wear-out information 36a includes a first table 102 and a second table 106. FIG. 4A illustrates an example of the first table 102. The first table 102 includes a plurality of first entries. The plurality of first entries store wear-out counter values of all the read/write unit regions of the user data recording region 32a. The number of first entries of the first table 102 is the same as the number of the read/write unit regions of the user data recording region 32a. The initial value of the wear-out counter value stored in each first entry is 0. A first index is associated with each first entry. The first index corresponds to identification information indicating each read/write unit region. The first table 102 is divided into a plurality of segments. Each segment includes several first entries. At a certain timing while the memory system 20 is powered on, the wear-out counter value stored in the first table 102 is written to the management information recording region 32b and non-volatilized. The wear-out counter value stored in the first table 102 is non-volatilized for each segment. The first table 102 includes a segment pointer that indicates a segment in which the wear-out counter value to be subsequently non-volatilized is stored.

FIG. 4B illustrates an example of the second table 106. The second table 106 includes a plurality of second entries. The plurality of second entries store logs indicating a state of updates of the first table 102. The log is a data set including the first index value and the wear-out counter value of the updated first entry of the first table 102. A second index is associated with each second entry. The wear-out information management unit 58 arranges the second entries of the second table 106 in an update order of logs. The second entry having a second index of 0 stores the oldest log. The number of second entries of the second table 106 is less than the number of first entries of the first table 102. When the memory system 20 starts up, each second entry of the second table 106 stores a data set including invalid data x indicating the first index value and invalid data x indicating the wear-out counter value. A second entry that stores a data set including the invalid data x is referred to as an empty second entry. A log that is a data set including the first index value and the wear-out counter value of the updated first entry is stored in an empty second entry. When the log is written to an empty second entry, the empty second entry becomes a log-storing second entry. If the number of logs stored in the second table 106, that is, if the number of log-storing second entries of the second table 106 becomes a certain number (for example, 2), the wear-out information management unit 58 writes the wear-out counter values stored in the plurality of respective first entries in one segment of the first table 102, and the logs stored in the log-storing second entries of the second table 106, to the management information recording region 32b to be non-volatilized.

When the memory system 20 starts up, the wear-out information restoration unit 62 reads the non-volatilized wear-out counter values and the non-volatilized logs from the management information recording region 32b and analyzes the logs to restore the wear-out counter values.

When the shut-down command or the abnormal power loss event notification is received, the wear-out information management unit 58 needs to non-volatilize at least all the logs. Therefore, the number of log-storing second entries that can be provided in the second table 106 is determined so that the size of the non-volatilized logs becomes equal to or less than the size of data that can be non-volatilized by the PLP. In this manner, in the segment/log method, the capacity of the first table 102 (corresponding to the "wear-out information main body" in the PLP batch method) does not depend on (i.e., is not limited by) the size of data that can be non-volatilized by the PLP. Therefore, the segment/log method can handle the wear-out information 36a of a larger size than the PLP batch method.

When using the segment/log method, the information required for the restoration process is the non-volatilized first table 102 (that is, wear-out counter values stored in all the segments) and the logs (stored in the second table 106) non-volatilized until the wear-out counter values stored in all the segments of the first table 102 are non-volatilized. The management information recording region 32b is configured as a ring buffer, and the wear-out counter values and the logs are cyclically written to the ring buffer. Therefore, when a capacity of the management information recording region 32b less than the sum of the capacity of the first table 102 and the total size of the logs that are non-volatilized until the wear-out counter values stored in all the segments of the first table 102 are non-volatilized, is allocated, the information required for the restoration process is overwritten in the ring buffer and lost. Therefore, the capacity to be allocated to the PCM 32 for the management information recording region 32b is required to be at least the above sum.

Meanwhile, for the same reason as in the PLP batch method, even if the capacity of the management information recording region 32b is larger than the above sum, if the capacity of the management information recording region 32b is small to a certain degree, the degree of wear-out resulting from reading and writing by the non-volatilization process of the estimated number of times during the product lifetime may be larger than the endurance. Therefore, it is required to allocate the management information recording region 32b having a large capacity so that the degree of wear-out resulting from reading and writing by the estimated number of the non-volatilization processes during the product lifetime is less than the endurance. The reason is that, while the total degree of wear-out resulting from reading and writing by the non-volatilization process of the estimated number of times during the product lifetime is constant, if the capacity of ring buffer is increased, the number of times of rewriting to the ring buffer decreases.

A specific processing flow of the non-volatilization of the wear-out counter value and the log in case of the normal operation in the segment/log method is as below.

(1) An event of causing an update of the first table 102 occurs. The event of causing the first table 102 to be updated is, for example, access to the PCM 32 with the host read command or the host write command. Due to the access, the wear-out information 36a is required to be updated.

(2) When a wear-out counter value of a certain read/write unit region of the PCM 32 increases, that is, the wear-out counter value is updated, the wear-out information management unit 58 updates, of the first table 102 stored in the RAM 30, the stored data (wear-out counter value) of the first entry of the first index corresponding to the accessed read/write unit region.

(3) The wear-out information management unit 58 writes the log of the update of the first table 102 to an empty second entry of the second table 106 of the RAM 30 according to the update of the wear-out counter value stored in the first entry of the first table 102. The empty second entry becomes a log-storing second entry.

(4) When the number of log-storing second entries in the second table 106 of the RAM 30 becomes a certain number, the wear-out information management unit 58 proceeds to the next process.

(a) The wear-out information management unit 58 non-volatilizes the wear-out counter value stored in a segment indicated by the segment pointer. The initial value of the segment pointer is freely set. After the wear-out counter value stored in the segment is non-volatilized, the wear-out information management unit 58 updates the segment pointer according to the procedure described in (c).

(b) The wear-out information management unit 58 non-volatilizes all logs stored in the second table 106. The wear-out information management unit 58 writes invalid data to the non-volatilized second entry (log-storing second entry) of the second table 106 and causes the log-storing second entry to be an empty second entry.

(c) The wear-out information management unit 58 causes the segment pointer to advance by one segment. When the segment pointer indicates the last segment, the wear-out information management unit 58 updates the segment pointer to indicate the first segment.

FIGS. 5A to 9B are diagrams illustrating the non-volatilization of the wear-out counter value and the log during the normal operation in the segment/log method as time elapses.

FIG. 5A illustrates an example of the first table 102 stored in the RAM 30 at a certain timing. FIG. 5B illustrates an example of the second table 106 stored in the RAM 30 at the same certain timing. In FIGS. 5A to 9B, the first table 102 includes 12 first entries. The first table 102 is divided, for example, into a segment A, a segment B, and a segment C. The segments A to C each include, for example, four first entries. The second table 106 includes, for example, two second entries. When the number of log-storing second entries provided in the second table 106 reaches a certain number (for example, 2), the second table 106 is non-volatilized.

At the certain timing, it is assumed that the wear-out counter value in the read/write unit region corresponding to a first index of 5 is 50. A first entry e1 stores the wear-out counter value of 50. The wear-out counter values stored in the entries of the first index other than 5 are each set as 0. At this timing, the segment pointer of the first table 102 indicates the segment B. In addition, a second entry e2 having a second index of 0 stores a log that is a data set including the first index value of 5 and the wear-out counter value of 50. A second entry e3 having a second index of 1 stores a data set including a first index value that is the invalid data x and a wear-out counter value that is the invalid data x. That is, the second entry e3 is an empty second entry.

Here, writing of data to the PCM 32 or reading of data from the PCM 32 according to the host write command or the host read command is performed several times. The wear-out information management unit 58 updates the first table 102 and the second table 106 according to the physical address notified by the write unit 54 or the read unit 52. FIG. 6A illustrates the updated first table 102. FIG. 6B illustrates the updated second table 106. FIG. 6A illustrates the first table 102 when the wear-out counter value of the read/write unit region corresponding to a first entry e4 of a first index of 3 is updated to 30. FIG. 6B illustrates the second table 106 when the second entry e3 stores a log that is a data set including the first index value of 3 and the updated wear-out counter value of 30 stored in the first entry e4. Note that, when a read or write process is continuously performed on the same read/write unit region according to the host write command or host read command, the wear-out information management unit 58 is not required to allocate an empty second entry of the second table 106 for each read or write process to store a log therein. The wear-out information management unit 58 may store multiple logs collectively into one empty second entry. FIG. 6B illustrates that, for example, in a case where the wear-out counter value increases by one per read process, 50 read processes have been continuously performed on the read/write unit region corresponding to the first index of 5, and 30 read processes have been continuously performed on the read/write unit region corresponding to the first index of 3.

Accordingly, the number of log-storing second entries of the second table 106 becomes 2. That is, the number of empty second entries of the second table 106 becomes 0. The second table 106 is in a full state in which another log cannot be stored therein any more. The wear-out information management unit 58 non-volatilizes the wear-out counter values that are stored in one segment of the first table 102. The wear-out information management unit 58 non-volatilizes the wear-out counter values stored in the segment B indicated by the segment pointer. The wear-out information management unit 58 writes the wear-out counter values stored in the four first entries of the segment B to the management information recording region 32b to non-volatilize the wear-out counter values. After the non-volatilization of the wear-out counter values stored in the segment B, the wear-out information management unit 58 causes the segment pointer to advance by one segment. As a result, the segment pointer indicates the segment C.

The wear-out information management unit 58 writes the wear-out counter values stored in the segment B to the management information recording region 32b to non-volatilize the wear-out counter values and simultaneously writes the two logs stored in the second table 106 to the management information recording region 32b to non-volatilize the two logs. The wear-out information management unit 58 writes to the management information recording region 32b, not only the wear-out counter values and the logs but also information indicating the non-volatilization order. The information indicating the order may be, for example, non-volatilization time.

Figure 7A:
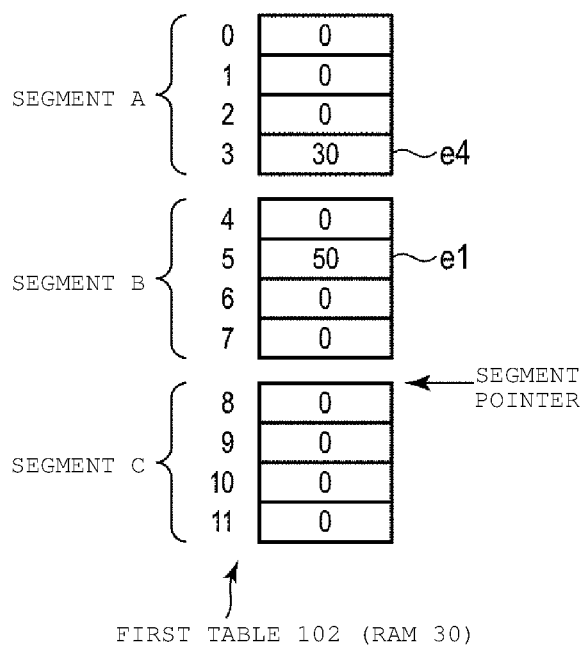
FIGS. 7A and 7B are diagrams illustrating an example of non-volatilization of segments and logs in the segment/log method according to the embodiment.
Figure 7B:
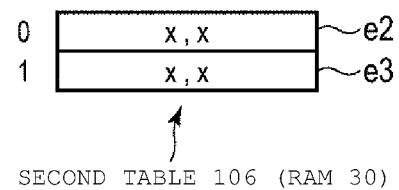

FIG. 7A illustrates the non-volatilized wear-out counter values stored in the segment B of the first table 102. The wear-out counter values stored in the four first entries of the segment B are not deleted even though they have been non-volatilized, and are still stored in the RAM 30. This is because the wear-out information 36a that is referred to when the wear leveling unit 60 performs the wear leveling process is the wear-out counter value stored in the first table 102 and thus is required to remain as it is in order to perform the wear leveling process in accordance with the actual degree of wear-out. FIG. 7B illustrates the second table 106 after non-volatilized. After the non-volatilization, a data set including invalid data is written to all the second entries e2 and e3 of the second table 106. Accordingly, all the second entries e2 and e3 of the second table 106 become empty second entries.

Thereafter, it is assumed that writing of data to the PCM 32 or reading of data from the PCM 32 is performed several times in accordance with the host write command or the host read command. The wear-out information management unit 58 updates the first table 102 and the second table 106 according to a physical address notified by the write unit 54 or the read unit 52. FIG. 8A illustrates the updated first table 102. FIG. 8B illustrates the updated second table 106. FIG. 8A illustrates the first table 102 when the wear-out counter value of a read/write unit region corresponding to a first entry e5 having a first index of 1 is updated to 100, and the wear-out counter value of a read/write unit region corresponding to a first entry e6 having a first index of 9 is updated to 900. With respect to the order of updating the wear-out counter value, the wear-out counter value of the read/write unit region corresponding to the first entry e5 is first updated to 100, and then the wear-out counter value of the read/write unit region corresponding to the first entry e6 becomes 900. FIG. 8B illustrates the second table 106 when the second entry e2 stores a log that is a data set including the first index value of 1 and the updated wear-out counter value of 100 stored in the first entry e5, and the second entry e3 stores a log that is a data set including the first index value of 9 and the updated wear-out counter value of 900 stored in the first entry e6.

Accordingly, the number of log-storing second entries of the second table 106 becomes 2. That is, the number of empty second entries of the second table 106 becomes 0. The second table 106 becomes a full state in which another log cannot be stored therein any more. The wear-out information management unit 58 non-volatilizes the wear-out counter values stored in one segment of the first table 102. The wear-out information management unit 58 non-volatilizes the wear-out counter values stored in the segment C indicated by the segment pointer. The wear-out information management unit 58 writes the wear-out counter values stored in the four first entries of the segment C to the management information recording region 32b and non-volatilizes the wear-out counter values. After the non-volatilization of the wear-out counter values stored in the segment C, the wear-out information management unit 58 causes the segment pointer to advance by one segment. As a result, the segment pointer indicates the segment A.

The wear-out information management unit 58 writes the wear-out counter values stored in the segment C to the management information recording region 32b to non-volatilize the wear-out counter values and simultaneously writes the two logs stored in the second table 106 to the management information recording region 32b to non-volatilize the two logs. The wear-out information management unit 58 writes not only the wear-out counter value and the log but also the information indicating the non-volatilization order to the management information recording region 32b.

Figures 9A, 9B:
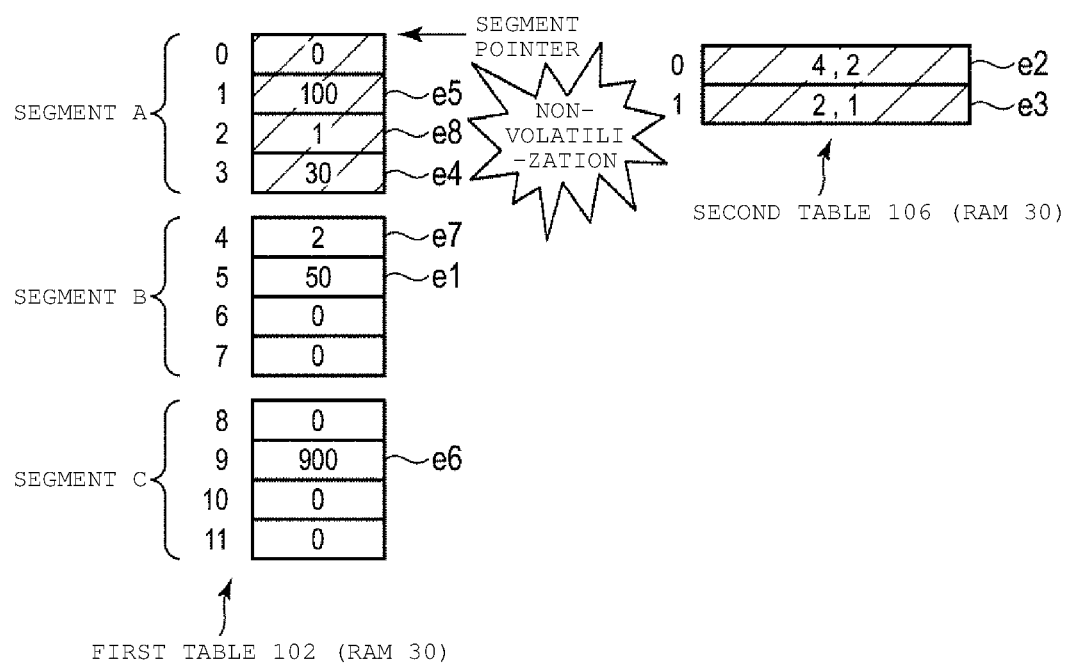
FIGS. 9A and 9B are diagrams illustrating an example of non-volatilization of segments and logs in the segment/log method according to the embodiment.

Thereafter, the writing of data to the PCM 32 or the reading of data from the PCM 32 according to the host write command or the host read command is performed several times. The wear-out information management unit 58 updates the first table 102 and the second table 106 according to a physical address notified by the write unit 54 or the read unit 52. FIG. 9A illustrates the updated first table 102. FIG. 9B illustrates the updated second table 106. FIG. 9A illustrates the first table 102 when the wear-out counter value of a read/write unit region corresponding to a first entry e7 of a first index of 4 is updated to 2, and the wear-out counter value of a read/write unit region corresponding to a first entry e8 having a first index of 2 is updated to 1. With respect to the order of the update of the wear-out counter value, the wear-out counter value of the read/write unit region corresponding to the first entry e7 is first updated to 2, and then the wear-out counter value of the read/write unit region corresponding to the first entry e8 becomes 1. FIG. 9B illustrates the second table 106 when the second entry e2 stores a log that is a data set including the first index value of 4 and the updated wear-out counter value of 2 stored in the first entry e7, and the second entry e3 stores a log that is the data set including a first index value of 2 and the updated wear-out counter value of 1 stored in the first entry e8.

Accordingly, the number of log-storing second entries of the second table 106 becomes 2. That is, the number of empty second entries of the second table 106 becomes 0. The second table 106 is in a full state in which another log cannot be stored therein any more. The wear-out information management unit 58 non-volatilizes the wear-out counter values stored in one segment of the first table 102. The wear-out information management unit 58 non-volatilizes the wear-out counter values stored in the segment A indicated by the segment pointer. The wear-out information management unit 58 writes the wear-out counter values stored in the four first entries of the segment A to the management information recording region 32b to non-volatilize the wear-out counter values. After the non-volatilization of the wear-out counter values stored in the segment A, the wear-out information management unit 58 causes the segment pointer to advance by one segment. As a result, the segment pointer indicates the segment B.

The wear-out information management unit 58 non-volatilizes the wear-out counter values stored in the segment A and writes the two logs stored in the second table 106 to the management information recording region 32b to non-volatilize the two logs. The wear-out information management unit 58 writes not only the wear-out counter value and the log but also the information indicating the non-volatilization order to the management information recording region 32b.

When the shut-down command or the abnormal power loss event notification is received, the wear-out information management unit 58 non-volatilizes at least the logs stored in the second table 106.

Next, a flow of restoration is described. The restoration is to read the non-volatilized wear-out counter values and logs from the management information recording region 32b, and store the wear-out counter values to the first entries of the first table 102 in the RAM 30. FIGS. 10A and 10B illustrate an example of a restoration sequence of the first table 102 in the segment/log method according to the embodiment. FIG. 10A illustrates the non-volatilized segments stored in the management information recording region 32b and the non-volatilized second tables. The non-volatilized segments store the non-volatilized wear-out counter values. The non-volatilized second table stores the non-volatilized logs. Note that FIG. 10A is a schematic diagram, and the non-volatilized segments and the non-volatilized second tables may not be alternately stored in physically adjacent regions of the management information recording region 32b. FIG. 10B illustrates chronological changes of the restored first table 102 in the RAM 30.

FIG. 10A illustrates an example of non-volatilization in the order of the wear-out counter values stored in the segment A, in the segment B, in the segment C, and in the segment A. The management information recording region 32b is configured as a ring buffer, and the non-volatilized segments and the second table 106 are cyclically written to the ring buffer. Accordingly, the degree of wear-out of the management information recording region 32b are made more uniform.

The wear-out counter values stored in the first table 102 are non-volatilized for each segment, and thus the wear-out counter values stored in the first table 102 are restored for each segment. The restoration order may be the same as or opposite to the non-volatilization order.

The wear-out counter values stored in a part of the first entries of the first table 102 are non-volatilized, and are non-volatilized also as logs along with the first index values. Therefore, the wear-out information restoration unit 62 reads the wear-out counter values stored in the first entries of the non-volatilized segments or the wear-out counter values in the logs stored in the non-volatilized second table from the management information recording region 32b. In the following description, the wear-out counter values stored in the first entries of the non-volatilized segments or the wear-out counter values in the logs stored in the non-volatilized second table are referred to as the non-volatilized wear-out counter values. The wear-out information restoration unit 62 writes the non-volatilized wear-out counter value to the corresponding first entry of the first table 102 as the wear-out counter value, and restores the wear-out counter values of the segment. When a first entry of a segment of the first table 102 that is to be restored has already stored valid data, that is, the wear-out counter value, the wear-out information restoration unit 62 skips the writing of the non-volatilized wear-out counter value to such a first entry.

In this manner, until all the first entries of the first table 102 store the wear-out counter values that were non-volatilized when the wear-out information management unit 58 received the shut-down command or the abnormal power loss event notification, the wear-out information restoration unit 62 continues the restoration.

More specifically, with reference to FIG. 10B, a method of restoring segments in an order opposite to the non-volatilization order is described. Here, an example in which restoration is performed in the order opposite to the non-volatilization order is described. The method is also applicable to an example in which the restoration is performed in the same order as the non-volatilization order.

The segment A that is last non-volatilized among the four non-volatilized segments stored in the management information recording region 32b includes four first entries (that is, a first entry having a first index of 0 that stores a wear-out counter value of 1000, a first entry having a first index of 1 that stores a wear-out counter value of 100, a first entry having a first index of 2 that stores a wear-out counter value of 22, and a first entry having a first index of 3 that stores a wear-out counter value of 30). The second table that is last non-volatilized among the four non-volatilized second tables stored in the management information recording region 32b includes two second entries (that is, a second entry having a second index of 0 that stores a log that is a data set including a first index value of 6 and a wear-out counter value of 6, and a second entry having a second index of 1 that stores a log that is a data set including a first index value of 9 and a wear-out counter value of 900).

When the restoration starts, the wear-out information restoration unit 62 writes the invalid data x to all the first entries of the first tables 102 stored in the RAM 30.

At time t1, the wear-out information restoration unit 62 reads the non-volatilized wear-out counter value of 1000 corresponding to the first index of 0 in the last non-volatilized segment A, reads the non-volatilized wear-out counter value of 100 corresponding to the first index of 1, reads the non-volatilized wear-out counter value of 22 corresponding to the first index of 2, and reads the non-volatilized wear-out counter value of 30 corresponding to the first index of 3. In addition, at the time t1, the wear-out information restoration unit 62 reads the log corresponding to the second index of 0 (the data set including the first index value of 6 and the non-volatilized wear-out counter value of 6) in the last non-volatilized second table, and reads the log corresponding to the second index of 1 (the data set including the first index value of 9 and the non-volatilized wear-out counter value of 900).

The wear-out information restoration unit 62 writes the non-volatilized wear-out counter value of 1000 corresponding to the first index of 0 that is read from the last non-volatilized segment A to the first entry having the first index of 0 in the first table 102 stored in the RAM 30. The wear-out information restoration unit 62 writes the non-volatilized wear-out counter value of 100 that is read from the last non-volatilized segment A and corresponds to the first index of 1, to the first entry having the first index of 1 in the first table 102 stored in the RAM 30. The wear-out information restoration unit 62 writes the non-volatilized wear-out counter value of 22 that is read from the last non-volatilized segment A and corresponds to the first index of 2 to the first entry having the first index of 2 in the first table 102 stored in the RAM 30. The wear-out information restoration unit 62 writes the non-volatilized wear-out counter value of 30 that is read from the last non-volatilized segment A and corresponds to the first index of 3 to the first entry having the first index of 3 in the first table 102 stored in the RAM 30. In addition, the wear-out information restoration unit 62 writes the non-volatilized wear-out counter value of 6 that is read from the last non-volatilized second table and corresponds to the first index value of 6 to the first entry of the first index of 6 in the first table 102 stored in the RAM 30. The wear-out information restoration unit 62 writes the non-volatilized wear-out counter value of 900 that is read from the last non-volatilized second table and corresponds to the first index value of 9 to the first entry having the first index of 9 in the first table 102 stored in the RAM 30.

The second-to-last non-volatilized segment C among the four non-volatilized segments stored in the management information recording region 32b includes four first entries (that is, a first entry having a first index of 8 that stores a wear-out counter value of 88, a first entry having a first index of 9 that stores a wear-out counter value of 900, a first entry having a first index of 10 that stores a wear-out counter value of 0, and a first entry having a first index of 11 that stores the wear-out counter value of 30). The second-to-last non-volatilized second table among the four non-volatilized second tables stored in the management information recording region 32b includes two second entries (that is, a second entry having the second index of 0 that stores a log that is a data set including a first index value of 8 and a wear-out counter value of 88 and a second entry having the second index of 1 that stores a log that is a data set including a first index value of 0 and a wear-out counter value of 1000).

At time t2, the wear-out information restoration unit 62 reads the non-volatilized wear-out counter value of 88 that corresponds to the first index of 8 in the second-to-last non-volatilized segment C, reads the non-volatilized wear-out counter value of 900 that corresponds to the first index of 9, reads the non-volatilized wear-out counter value of 0 that corresponds to the first index of 10, and reads the non-volatilized wear-out counter value of 30 that corresponds to the first index of 11. In addition, at the time t2, the wear-out information restoration unit 62 reads the log corresponding to the second index of 0 in the second-to-last non-volatilized second table (the data set including the first index value of 8 and the non-volatilized wear-out counter value of 88), and reads the log corresponding to the second index of 1 (the data set including the first index value of 0 and the non-volatilized wear-out counter value of 1000).

The first entries having the first indexes of 0 and 9 in the first table 102 already store wear-out counter values in the restoration at the time t1. Accordingly, the wear-out information restoration unit 62 writes non-volatilized wear-out counter values other than the non-volatilized wear-out counter values corresponding to the first indexes of 0 and 9 among the read non-volatilized wear-out counter values, that is, the non-volatilized wear-out counter values of 88, 0, and 30 corresponding to the first indexes of 8, 10, and 11, to the first entries of the first indexes of 8, 10, and 11 in the first table 102, respectively, as the wear-out counter values.

The wear-out counter value corresponding to the first index of 8 is included in both of the segment C and the non-volatilized second table, which are to be restored at the time t2. The first entry of the segment and the second entry of the second table that were non-volatilized at the same timing store the same wear-out counter value. Therefore, when the first indexes (in this example, the first indexes of 8) overlap with each other between the non-volatilized segment and the non-volatilized second table, the wear-out information restoration unit 62 may write any of the non-volatilized wear-out counter value of 88 corresponding to the first index of 8 of the segment C and the non-volatilized wear-out counter value of 88 corresponding to the first index of 8 of the second table, to the first entry having the first index of 8 in the first table 102.

The third-to-last non-volatilized segment B among the four segments stored in the management information recording region 32b includes four first entries (that is, a first entry having a first index of 4 that stores a wear-out counter value of 40, a first entry having the first index of 5 that stores a wear-out counter value of 50, a first entry having a first index of 6 that stores a wear-out counter value of 0, and a first entry having a first index of 7 that stores a wear-out counter value of 30). The third-to-last non-volatilized second table among the four non-volatilized second tables stored in the management information recording region 32b includes two second entries (that is, a second entry having a second index of 0 that stores a log that is a data set including a first index value of 5 and a wear-out counter value of 50 and a second entry having a second index of 1 that stores a log that is a data set including a first index value of 2 and a wear-out counter value of 22).

At time t3, the wear-out information restoration unit 62 reads the non-volatilized wear-out counter value of 40 corresponding to the first index of 4 in the third-to-last non-volatilized segment B, reads the non-volatilized wear-out counter value of 50 corresponding to the first index of 5, reads the non-volatilized wear-out counter value of 0 corresponding to the first index of 6, and reads the non-volatilized wear-out counter value of 30 corresponding to the first index of 7. In addition, at the time t3, the wear-out information restoration unit 62 reads the log corresponding to the second index of 0 in the third-to-last non-volatilized second table (the data set including the first index value of 5 and the non-volatilized wear-out counter value of 50), and reads the log corresponding to the second index of 1 (the data set including the first index value of 2 and the non-volatilized wear-out counter value of 22).

In the first table 102, the first entries having the first indexes of 2 and 6 already store the wear-out counter values in the restoration by the time t2. Therefore, the wear-out information restoration unit 62 writes non-volatilized wear-out counter values other than the non-volatilized wear-out counter values that correspond to the first indexes of 2 and 6 among the read non-volatilized wear-out counter values, that is the non-volatilized wear-out counter value of 40, and 30 that correspond to the first indexes of 4, 5, and 7 to the first entries of the first indexes of 4, 5, and 7 in the first table 102, respectively, as the wear-out counter values. This completes the restoration.

In the segment/log method, it is required to select an appropriate parameter (a segment length, a size of a log, and a capacity of the management information recording region 32b) from the update frequency of the wear-out counter value and the capacity of the first table 102. The capacity of the first table 102 is the size (byte or bit) of one first entry multiplied by the number of first entries.

The capacity of the first table 102 is set as $C_{Table}$, the number of first entries of the first table 102 is set as $N_{TableEntry}$, the segment length (the number of first entries in one segment) is set as $N_{segment}$, and the size of the log that is non-volatilized along with one segment is set as $C_{Log}$. In the management information recording region 32b, at least a region having a capacity has to be allocated, which corresponds to the sum of the capacity of the first table 102 (the sum of sizes of all segments) and the total size of logs non-volatilized while the segment pointer goes once around the first table 102. The minimum capacity is referred to as Constraint 1.

Constraint 1: Capacity of Management Information Recording Region $32b \geq C_{Table} + (N_{TableEntry}/N_{segment}) \times C_{Log}$ Meanwhile, when wear-out counter values are updated at a high frequency, the number of times of writing to the PCM 32 for non-volatilization of wear-out counter values increases. Therefore, in view of the endurance, the capacity of the management information recording region 32b is restricted. Here, while reading from the PCM 32 in the restoration process is performed only once for each restoration process, writing to the PCM 32 in the non-volatilization process is performed a plurality of times during the normal operation. Therefore, in order to simplify the calculation, attention is paid to the number of times of writing, which becomes the main cause of the wear-out. Endurance (indicating the number of times of writing here) is set as E, the estimated number of updates of the first table 102 during product lifetime is set as $N_{Update}$, a capacity of the first table 102 per a first entry is set as $C_{TableEntry}$, a size of a log per a second entry is set as $C_{LogEntry}$, and the number of second entries of the second table 106 non-volatilized along with the non-volatilization of one segment is set as $N_{LogEntry}$. Here, $C_{Table}=C_{TableEntry} \times N_{TableEntry}$. In addition, $C_{Log}=C_{LogEntry} \times N_{LogEntry}$. If the capacity of the management information recording region 32b is large, the number of times of rewriting to the management information recording region 32b decreases, and thus the wear-out counter value representing the degree of wear-out resulting from reading and writing by the non-volatilization process of the estimated number of times during the product lifetime, does not exceed the endurance. In view of the endurance, the capacity required for the management information recording region 32b is referred to as Constraint 2. Specifically, if the first table 102 is updated $N_{Update}$ times, the non-volatilization process (that is, non-volatilization of one segment and $N_{LogEntry}$ logs) is performed $N_{Update}/N_{LogEntry}$ times. The write amount for one non-volatilization process is ($C_{TableEntry} \times N_{segment}+C_{LogEntry} \times N_{LogEntry}$). The capacity required for the management information recording region 32b is obtained by dividing the write amount by the endurance E.

Constraint 2: Capacity of Management Information Recording Region $32b \geq ((N_{Update}/N_{LogEntry}) \times (C_{TableEntry} \times N_{segment}+C_{LogEntry} \times N_{LogEntry}))/E$ Since it is required to satisfy both Constraint 1 and Constraint 2, the larger of Constraint 1 and Constraint 2 becomes the capacity required as the management information recording region 32b.

Partial-or-Whole Cache Method (Basic Method)

FIGS. 11A to 11C are diagrams illustrating an example of a data structure of wear-out information in a partial-or-whole cache method. This method uses a cache having a structure in a generally known memory hierarchical structure.

In this method, the management information recording region 32b includes a region where the wear-out counter values of all the read/write unit regions of the PCM 32 are stored. This region is referred to as a non-volatilized table 116 (FIG. 11C). The non-volatilized table 116 includes a plurality of third entries. The plurality of third entries store wear-out counter values of all the read/write unit regions of the PCM 32. The number of third entries is the same as the number of read/write unit regions of the PCM 32. A third index is associated with each third entry. The third index corresponds to identification information indicating a read/write unit region.

The cache of the RAM 30 is divided into a dirty cache 112 (FIG. 11A) and a clean cache 114 (FIG. 11B). In a whole cache method, the wear-out counter values stored in the third entries of the entire non-volatilized table 116 are cached in the RAM 30. In a partial cache method, the wear-out counter values stored in the third entries of a part of the non-volatilized table 116 are cached in the RAM 30. The wear-out counter value can be referred to from any one of the dirty cache 112 or the clean cache 114.

The dirty cache 112 includes a plurality of fourth entries. A fourth index is associated with each fourth entry. Each fourth entry can store a data set including a third index value corresponding to a certain read/write unit region and a wear-out counter value of this read/write unit region. The fourth entry that stores a data set including the invalid data x is referred to as an empty fourth entry. If data (that is, a data set including a third index value and a wear-out counter value) is written to an empty fourth entry, the empty fourth entry becomes a data-storing fourth entry. If the wear-out counter value of a certain read/write unit region is updated, the updated wear-out counter value is only stored in the dirty cache 112 and is not stored in the clean cache 114 or the non-volatilized table 116. The data stored in the dirty cache 112 includes a wear-out counter value that is updated but is not non-volatilized to the non-volatilized table 116. Therefore, a wear-out counter value stored in the non-volatilized table 116 is different from a wear-out counter value stored in the dirty cache 112.

The clean cache 114 includes a plurality of (for example, 6) fifth entries. A fifth index is associated with each fifth entry. Each fifth entry can store a data set including a third index value corresponding to a certain read/write unit region and a wear-out counter value of the read/write unit region. The fifth entry that stores a data set including the invalid data x is referred to as an empty fifth entry. If data (that is, a data set including a third index value and a wear-out counter value) is written to an empty fifth entry, the empty fifth entry becomes a data-storing fifth entry. The wear-out counter value of a certain third index stored in the data-storing fifth entry is the same as the wear-out counter value stored in the third entry of the corresponding third index of the non-volatilized table 116. Therefore, when the shut-down command or the abnormal power loss event notification is received, the wear-out information management unit 58 is not required to non-volatilize data of the clean cache 114.

The wear-out information management unit 58 arranges the fifth entries of the clean cache 114 in descending order of cache efficiency. An example of the descending order of cache efficiency is a least recently used (LRU) order. In this case, the wear-out information management unit 58 arranges the fifth entries of the clean cache 114 in descending order of time (i.e., from new to old) representing when the stored wear-out counter value was last referred to or added to the clean cache 114. Accordingly, the wear-out counter values are purged from the clean cache 114 in an order from the wear-out counter value that was referred to or added to the clean cache 114 least recently.

The wear-out information management unit 58 arranges the fourth entries of the dirty cache 112 in descending order of cache efficiency. An example of descending order of cache efficiency is the LRU order. In this case, the wear-out information management unit 58 arranges the fourth entries of the dirty cache 112 in descending order of time (i.e., from new to old) representing when the stored wear-out counter value was last updated or added to the dirty cache 112. Accordingly, the wear-out counter values are purged from the dirty cache 112 in an order from the wear-out counter value that was last updated or added to the dirty cache 112 least recently.

When a wear-out counter value is updated, the wear-out counter value is written to the dirty cache 112. At this time, if all the fourth entries of the dirty cache 112 store valid data, the wear-out information management unit 58 purges a wear-out counter value of a fourth entry to be purged from the dirty cache 112, for example, in accordance with the descending order of cache efficiency described above. The wear-out information management unit 58 writes the wear-out counter value purged from the dirty cache 112 to the non-volatilized table 116 to non-volatilize the wear-out counter value and also writes the wear-out counter value to the clean cache 114. In the example illustrated in FIGS. 11A to 11C, the wear-out counter values have not been purged yet from the dirty cache 112, the clean cache 114 is in an empty state, and the wear-out counter value of the non-volatilized table 116 has not been updated.

When a wear-out counter value of a certain read/write unit region is updated, and the corresponding wear-out counter value has been stored in the dirty cache 112, the wear-out counter value of the dirty cache 112 is updated.

When a wear-out counter value of a certain read/write unit region is updated, the corresponding wear-out counter value has not yet been stored in the dirty cache 112, and the dirty cache 112 has an empty fourth entry, a data set including a third index value of the corresponding read/write unit region and the wear-out counter value is stored in the empty fourth entry of the dirty cache 112.

When a wear-out counter value of a certain read/write unit region is updated, the corresponding wear-out counter value has not yet been stored in the dirty cache 112, and the dirty cache 112 does not have an empty fourth entry, data (that is, a data set including a third index value and a wear-out counter value) is purged from one data-storing fourth entry of the dirty cache 112, and the one data-storing fourth entry is regarded as an empty fourth entry. The wear-out counter value included in the purged data is written back (non-volatilized) to the non-volatilized table 116. Also, the data set including the third index value of the corresponding read/write unit region and the wear-out counter value is stored in the empty fourth entry.

In the whole cache method, the total capacity of the dirty cache 112 and the clean cache 114 is at least equal to a capacity of the non-volatilized table 116. In the partial cache method, the total capacity of the dirty cache 112 and the clean cache 114 is less than the capacity of the non-volatilized table 116.

Even though all the management information 36 can be managed in the RAM 30 by the PLP batch method or the segment/log method, it is assumed that all the management information 36 can be cached in the RAM 30 by the whole cache method. The reason is as follows. That is, in the PLP batch method or the segment/log method, the management information recording region 32b is configured as a ring buffer, and non-volatilized information is cyclically written to the ring buffer. Accordingly, while the wear-out of the management information recording region 32b is made uniform, the capacity of the ring buffer is determined in accordance with the estimated number of non-volatilization processes during the product lifetime. Therefore, according to the estimated number of non-volatilization processes during the product lifetime, when the size of the management information 36 including the wear-out counter value is large to a certain degree, the capacity that can store the user data is greatly reduced. This problem can be solved by the whole cache method.

In the partial-or-whole cache method, for example, by performing a purging process in case of a cache miss like in a generally known memory hierarchical structure, a wear-out counter value can be non-volatilized to the non-volatilized table 116. The updated wear-out counter value is stored in the dirty cache 112, and is not stored in the non-volatilized table 116. Therefore, when the shut-down command or the abnormal power loss event notification is received, if a wear-out counter value stored in the dirty cache 112 is not written back to the non-volatilized table 116, the wear-out counter value is lost. Also, in the normal operation, when there is no empty fourth entry in the dirty cache 112, even the wear-out counter value is updated, data of one data-storing fourth entry is purged, an empty fourth entry is made, and the updated wear-out counter value is stored in the empty fourth entry. The wear-out counter value in the purged data is written back to the non-volatilized table 116.

Generally, since an order of determining purging targets is undefined, the wear-out varies between the read/write unit regions of the non-volatilized table 116, to which the destination of the purged target. Therefore, unlike the PLP batch method or the segment/log method, the wear leveling process of the management information recording region 32b is required.

For example, when wear leveling of the user data recording region 32a is performed, the wear leveling unit 60 also includes the management information recording region 32b in the wear leveling target. Therefore, the recording regions of the PCM 32 are different from the PLP batch method or the segment/log method, and thus are shared by the user data recording region 32a and the management information recording region 32b. More specifically, one recording region of the PCM 32 may be used as the user data recording region 32a for recording the user data at one point of time and may be used as the management information recording region 32b for recording the management information 36 at another point of time. The wear leveling unit 60 determines allocation of a physical address and an internal logical address of the recording region of the PCM 32 based on the degree of wear-out of the recording region of the PCM 32. Each functional unit of the CPU 42 can know whether a recording region of the PCM 32 is the user data recording region 32a or the management information recording region 32b based on the internal logical address. For example, when each functional unit of the CPU 42 uses a first address to a predetermined address of an internal logical address space as the user data recording region 32a, and uses the predetermined address to the last address of the internal logical address space as the management information recording region 32b, each functional unit of the CPU 42 can know whether a recording region of the PCM 32 is the user data recording region 32a or the management information recording region 32b based on the internal logical address.

That is, in the partial-or-whole cache method, the internal logical address is allocated so as to indicate the non-volatilization destination of the management information 36, and the management information 36 is also regarded as a target of wear leveling and address conversion. Therefore, by the partial-or-whole cache method, there may be a case where the management information required for a bootstrap, for example, the address conversion information 36b cannot be managed. Instead, by the partial-or-whole cache method, management information that is not required to be first read when the memory system 20 starts up, for example, the wear-out counter value can be managed.

In the partial-or-whole cache method, unlike the PLP batch method or the segment/log method, the capacity of the non-volatilized table 116 to be allocated for recording the wear-out counter value may be only the size of the wear-out counter value. Accordingly, compared with the PLP batch method or the segment/log method, more capacity can be provided to store user data.

In the partial-or-whole cache method, the management of the fourth entry of the dirty cache 112 is required. The management of the fourth entry includes determination of which of data-storing fourth entries of the dirty cache 112, in which a wear-out counter value is stored, to be non-volatilized when the shut-down command or the abnormal power loss event notification is received. A plurality of methods that implement this management are considered.

As illustrated in FIGS. 11A to 11C, one method is to divide caches into the clean cache 114 and the dirty cache 112 and limit the number of data-storing fourth entries of the dirty cache 112 to the number for storing data of equal to or less than the size that can be non-volatilized with the PLP. In addition, in another method, one cache is provided, but addresses of the fourth entries of the dirty cache 112 and the number thereof are independently managed, and the number of the fourth entries of the dirty cache 112 is limited. Regardless of the management method, if the non-volatilization by the PLP is required, it is required to limit the number of data-storing fourth entries of the dirty cache 112 in accordance with the size for which non-volatilization by the PLP can be performed. This is a constraint of the performance of the partial-or-whole cache method.

For example, it is assumed that the size that can be non-volatilized by the PLP is 1 MB, and the size of the wear-out counter value is 100 MB. In this case, even if the entire wear-out counter values are randomly updated, only 1 MB out of 100 MB can be stored as the dirty cache 112. Therefore, in case of random writing, a wear-out counter value stored in any one of the data-storing fourth entries of the dirty cache 112 is written (or, purged) to the non-volatilized table 116 with a probability of 99% to be non-volatilized. That is, if all the wear-out counter values are randomly updated, the frequency of the non-volatilization may be increased.

In addition, when a wear-out counter value is referred to, depending on whether the wear-out counter value to be read is cached, whether to read the non-volatilized wear-out counter value from the non-volatilized table 116 changes. When the wear-out counter value to be read is cached, the corresponding wear-out counter value is read from the dirty cache 112 or the clean cache 114. When the wear-out counter value to be read is not cached, the corresponding wear-out counter value is read from the non-volatilized table 116 and cached. Therefore, not only the capacity of the dirty cache 112 but also a read cache hit rate, which is determined in accordance with the capacity of the clean cache 114, becomes an important performance indicator.

The writing of a wear-out counter value to the non-volatilized table 116 may be performed by a Read-Modify-Write process. The writing of a wear-out counter value to the non-volatilized table 116 is performed for each read/write unit region of the PCM 32, and one read/write unit region may store a plurality of wear-out counter values. In case of random writing, in most cases, the wear-out counter value to be updated is one of the plurality of wear-out counter values of one read/write unit region. In this case, first, the plurality of wear-out counter values of the one read/write unit region are read from the non-volatilized table 116, and one wear-out counter value thereof is updated. The updated wear-out counter value is cached in the dirty cache 112. The wear-out counter values that are read but not updated are cached in the clean cache 114. When the updated wear-out counter value is purged from the dirty cache 112, the updated wear-out counter value is written to the non-volatilized table 116 together with the wear-out counter values cached in the clean cache 114. Also, with the clean cache 114, the first reading from the non-volatilized table 116 of the Read-Modify-Write process can be omitted when the wear-out counter value is purged from the dirty cache 112, and thus the writing performance of the memory system improves. In addition, the size of the wear-out counter value is several bytes, and is smaller than the capacity of the read/write unit region of the PCM 32. Therefore, when the cache is managed for each read/write unit region of the PCM 32, a plurality of wear-out counter values are stored in one entry of the clean cache 114 or the dirty cache 112. Therefore, in a sequential access, it is likely that a capacity constraint of the dirty cache 112 is not a big problem.

When the memory system 20 starts up, in the same manner as the cache in a generally known memory hierarchical structure, the restoration process of the wear-out counter value is not required to be performed. When the wear-out counter value is referred to during the normal operation, the wear-out counter value may be appropriately read from the non-volatilized table 116 to the dirty cache 112 or the clean cache 114. Note that, in case of the whole cache method, when the memory system 20 starts up, all the wear-out counter values may be read from the non-volatilized table 116 to the dirty cache 112 or the clean cache 114. This enables to omit the reading of the wear-out counter value from the non-volatilized table 116 to the dirty cache 112 or the clean cache 114 during the normal operation, and thus the performance during the normal operation can be improved.

Next, several methods relating to the non-volatilization of the wear-out information 36a according to the present embodiment are described.

Difference Method

The wear-out counter value that is one of the management information has a large size but has a high update frequency. This causes several problems. One is a problem of endurance consumption. The wear-out counter value is updated at least once for each one host access. Even in a case of a read access by the host 10, the wear-out counter value is also updated. When the segment/log method is used, if the number of logs determined to be equal to or less than the size of the data that can be non-volatilized by the PLP is N, with respect to N updates of the wear-out counter values on average, the logs for N updates and the wear-out counter values stored in one segment are non-volatilized. When the partial-or-whole cache method is used, the degree of wear-out also depends on the cache hit rate of the dirty cache 112, but if full—capacity random reading is performed, for example, under a condition that a wear-out counter value of several hundreds of MB is managed by the dirty cache 112 of 1 MB, purging from the dirty cache 112 and non-volatilization occurs with a probability of 99% or more for one update of the wear-out counter value. It is assumed that the degree of wear-out of the PCM 32 resulting from a read access is about one hundredth of the degree of wear-out of the PCM 32 by a write access, and thus it is not preferable that, in view of the endurance, writing to the PCM 32 resulting from the update of wear-out counter value is performed once for each one time (or several times) of host reading.

Another problem is a problem of band-width consumption by non-volatilization of a wear-out counter value. The band-width herein is a data transmission amount between the controller 34 and the PCM 32 in a unit period of time. A band-width that is consumed by the non-volatilization of the wear-out counter value may give an influence on the performance of transmission of user data between the host 10 and the PCM 32. In case of the partial-or-whole cache method, one writing to the PCM 32 resulting from the non-volatilization of the wear-out counter value is required almost every time of host writing, which requires substantially two times of the band-width. This becomes a considerably difficult problem in view of the performance and cost.

If the PLP batch method can be employed, the problems described here do not occur. However, the PLP batch method cannot be applied to the management of the management information 36 having a large size.

As a method of preventing excessive increase of a degree of wear-out resulting from non-volatilization of a wear-out counter value, a difference method according to the embodiment is described. The difference method is a method of managing a log of the segment/log method or cache data of the partial-or-whole cache method as a difference.

The difference refers to a difference obtained by subtracting (the sum of) already non-volatilized wear-out counter values from the current wear-out counter value. The wear-out information 36a includes a difference counter for obtaining a difference value. The difference counter is provided for each read/write unit region of the PCM 32. When the wear-out counter value is updated, the difference value is also updated. When the wear-out counter value is non-volatilized, the difference value returns to 0. Accordingly, the difference value can indicate the difference obtained by subtracting (the sum of) the already non-volatilized wear-out counter values from the current wear-out counter value.

The wear-out information management unit 58 controls the non-volatilization of the wear-out counter value based on the difference value. For example, during the normal operation, when the difference value is equal to or more than a predetermined threshold value according to access of a certain read/write unit region, the wear-out information management unit 58 writes the wear-out counter value of the certain read/write unit region to the management information recording region 32b to non-volatilize the wear-out counter value. When the wear-out counter value of the certain read/write unit region is non-volatilized, the wear-out information management unit 58 resets the difference value of the read/write unit region to 0. When the difference value is less than the predetermined threshold value, the wear-out information management unit 58 does not non-volatilize the wear-out counter value. Even if a wear-out counter value having a small difference value is lost, the difference between the non-volatilized wear-out counter value and the actual wear-out counter value is small. Thus, in performing wear leveling based on the wear-out counter value, it is considered that this causes a problem rarely. In this manner, since the wear-out counter value is not non-volatilized at each time of access, it is possible to reduce the wear-out of the PCM 32.

There is an upper limit to the size of the wear-out counter value that the RAM 30 can store. There is also an upper limit to the size of the difference value that the RAM 30 can store. That is, the RAM 30 cannot store difference values of a part of the read/write unit regions. If a certain read/write unit region other than read/write unit regions corresponding to the difference values stored in the RAM 30 is accessed, and the wear-out counter value and the difference value of the certain read/write unit region are updated, the wear-out information management unit 58 writes the updated wear-out counter value and the difference value to the RAM 30. Before the updated difference value is written to the RAM 30, the wear-out information management unit 58 checks the size of the difference values that the RAM 30 already stores. When the size of the difference values that the RAM 30 already stores is a threshold size or more, the wear-out information management unit 58 determines that an available capacity of a region of the RAM 30 for storing a difference value is insufficient. In this case, the wear-out information management unit 58 purges a small difference value from the RAM 30 and allocates a region for storing the updated difference value to be newly written.

The wear-out information management unit 58 does not non-volatilize a difference value purged from the RAM 30. As described above, even if a small difference value is lost, a difference between the non-volatilized wear-out counter value and the actual wear-out counter value is small. Thus, in performing wear leveling based on the wear-out counter value, it is considered that this causes a problem rarely.

The wear-out information management unit 58 non-volatilizes wear-out counter values in descending order of difference values when a shut-down command or an abnormal power loss event notification is received. In the non-volatilization, it is likely that a wear-out counter value having a small difference value is not non-volatilized. As described above, it is considered that, even if a wear-out counter value having a small difference value is lost, this cause a problem rarely.

Figure 12A:
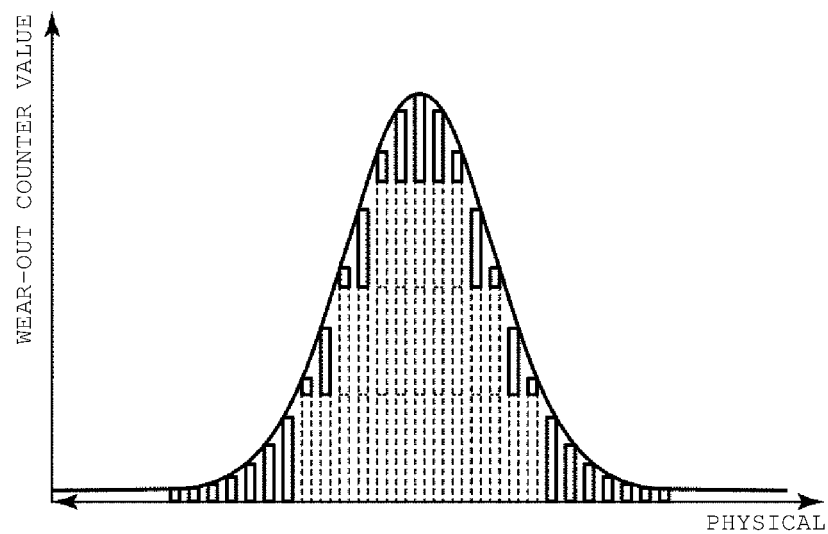
FIGS. 12A and 12B are diagrams illustrating the principle of a difference method according to the embodiment.
Figure 12B:
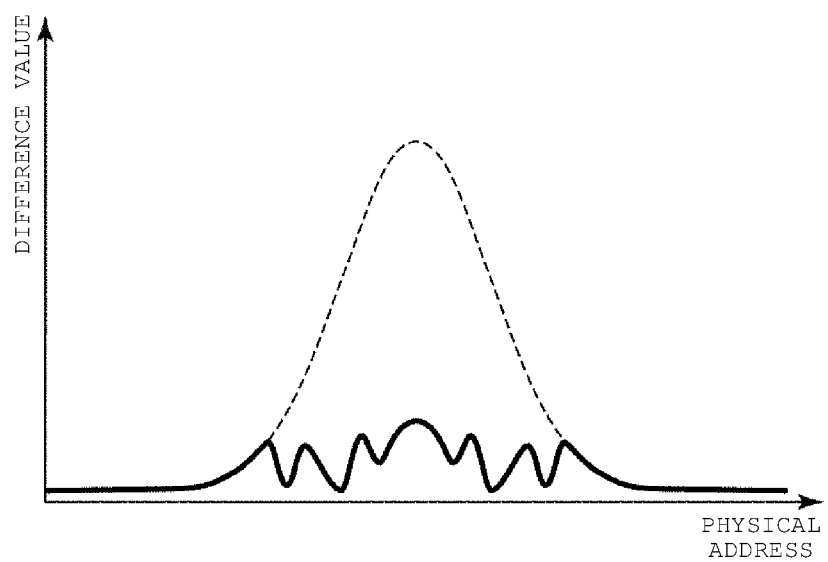

FIG. 12A is a diagram illustrating the principle of the difference method. FIG. 12A illustrates the distribution of the wear-out counter values that the RAM 30 stores. The shape of the distribution of the wear-out counter values is merely an example, and a normal distribution is assumed here. FIG. 12B illustrates a distribution of differences of the wear-out counter values. The horizontal axes in FIGS. 12A and 12B correspond to physical addresses of the read/write unit regions of the management information recording region 32b. Dashed vertical bars in a bar graph shown in FIG. 12A indicate the sum of non-volatilized wear-out counter values. Solid vertical bars in the bar graph shown in FIG. 12A indicate wear-out counter values that are not non-volatilized, that is, the difference values. Dashed lines shown in FIG. 12B indicate wear-out counter values and solid lines indicate difference values. That is, the difference values corresponding to the solid lines of FIG. 12B are not likely to be non-volatilized and to be lost when a shut-down command or an abnormal power loss event notification is received. Even if all difference values corresponding to the solid lines of FIG. 12B are lost, all of the lost difference values are less than a predetermined threshold value. Further, when a shut-down command or an abnormal power loss event notification is received, wear-out counter values are non-volatilized in descending order of the difference values, and thus it can be expected that the actually lost difference value is a value considerably smaller than the predetermined threshold value. Therefore, it is considered that this causes a problem rarely.

When a shut-down command is received, the data size that can be non-volatilized is not limited based on the power supply capability of the backup power supply 28, and thus compared with a case where an abnormal power loss event notification is received, more wear-out counter values may be non-volatilized. Accordingly, the lost difference value can be further reduced.

Hereinafter, the wear-out information management method according to the embodiment obtained by combining the difference method with the segment/log method and the partial-or-whole cache method is described.

Segment/Log/Difference Method

The difference between the segment/log method illustrated in FIGS. 4A to 10B and the present method is the contents of logs. In the segment/log method, logs are each a data set including a first index value of a first entry and a wear-out counter value of the updated first table 102. In the present method, the logs are each a data set including a first index value of a first entry and a difference of wear-out counter values of the updated first table 102.

FIGS. 13A to 17D are diagrams illustrating updates of segments and logs during a normal operation as time elapses, in the segment/log/difference method.

Figure 13A:
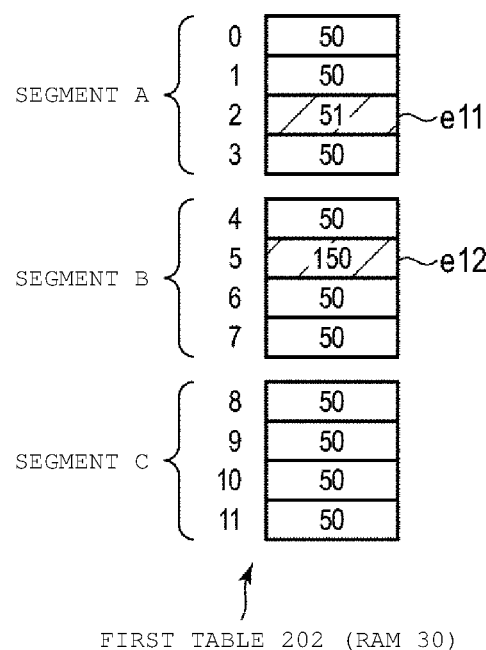
FIGS. 13A and 13B are diagrams illustrating an example of non-volatilization in a segment/log/difference method according to the embodiment.
Figure 13B:
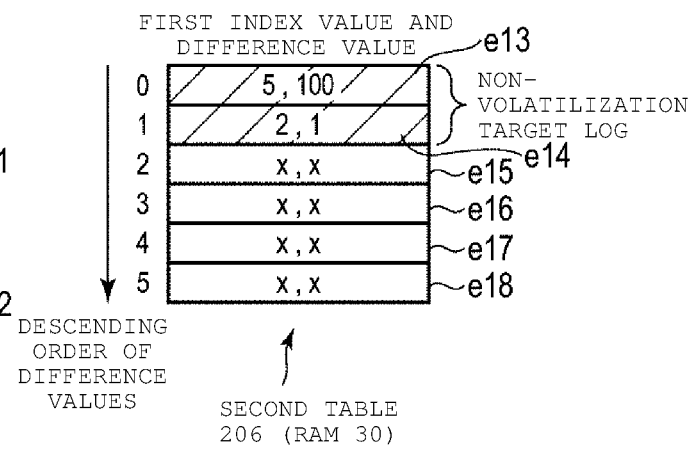

FIG. 13A illustrates an example of a first table 202 stored in the RAM 30 at a certain timing. The first table 202 corresponds to the first table 102 in the segment/log method. Detailed descriptions of the structures and actions of the first table 202 which are the same as those of the first table 102 are omitted. FIG. 13B illustrates an example of a second table 206 stored in the RAM 30 at the certain timing. The second table 206 corresponds to the second table 106 of the segment/log method. Detailed descriptions of the structures and actions of the second table 206 which are the same as those of the second table 106 are omitted. The first table 202 and the second table 206 are included in the wear-out information 36a. In FIGS. 13A to 16B, the second table 206 includes, for example, six second entries.

A plurality of second entries of the second table 206 store logs indicating a state of the most recent several updates of the first table 202. The logs are each a data set including a first index value of the updated first entry and a difference of the wear-out counter values of the first table 202. The wear-out information management unit 58 arranges the second entries of the second table 206 in descending order of the difference values. If a difference value of a certain log stored in the second table 206 exceeds a predetermined log non-volatilization threshold value (for example, 500), one or more logs stored in the second table 206 are non-volatilized. The second table 206 may store logs more than the number of logs that are non-volatilized in one non-volatilization process. This is because, by storing as many logs as possible in the second table 206, discard of logs described below does not occur as much as possible, to minimize an error from the actual wear-out counter value.

At the certain timing, the wear-out counter value of all the first entries of the first table 202 is 50, and all the wear-out counter values are also stored (that is, non-volatilized) in the management information recording region 32b. At this timing, all the second entries of the second table 206 are set as empty second entries.

From this state, it is assumed that the writing of data to the PCM 32 or the reading of data from the PCM 32 according to a host write command or a host read command is performed several times. The wear-out information management unit 58 updates the first table 202 and the second table 206 according to physical addresses notified by the write unit 54 or the read unit 52. FIG. 13A illustrates the updated first table 202. FIG. 13B illustrates the updated second table 206. FIG. 13A illustrates the first table 202 when the wear-out counter value of a read/write unit region corresponding to a first entry e11 having a first index of 2 is updated to 51, and the wear-out counter value of a read/write unit region corresponding to a first entry e12 having a first index of is updated to 150.

The wear-out information management unit 58 does not write the wear-out counter value of the updated first index of the first table 202 but writes the difference value between before and after the update in the second table 206 as a log together with the first index value. FIG. 13B illustrates the second table 206 stored in the RAM 30 at this point. The wear-out information management unit 58 arranges the second entries of the second table 206 in descending order of the difference values, and thus a log that is a data set including the first index value of 5 and a difference value of 100 (=150-50) is written to a second entry e13 having a second index of 0, and a log that is a data set including the first index value of 2 and a difference value of 1(=51-50) is written to a second entry e14 having a second index of 1. These two second entries e13 and e14 are log-storing second entries. The other second entries e15, e16, e17, and e18 are empty second entries.

Thereafter, the writing of data to the PCM 32 or the reading of data from the PCM 32 is performed several times according to the host write command or the host read command. The wear-out information management unit 58 updates the first table 202 and the second table 206 according to physical addresses notified by the write unit 54 or the read unit 52. FIG. 14A illustrates the updated first table 202. FIG. 14B illustrates the updated second table 206. FIG. 14A illustrates the first table 202 when a wear-out counter value of a first entry e19 having a first index of 0 is updated to 150, a wear-out counter value of the first entry e12 having the first index of 5 is updated to 450, a wear-out counter value of a first entry e20 having a first index of 6 is updated to 82, a wear-out counter value of a first entry e21 having a first index of 7 is updated to 250, and a wear-out counter value of a first entry e22 having a first index of 9 is updated to 53.

The difference value of the wear-out counter value of the first entry e19 is updated to 100 (=150-50), the difference value of the wear-out counter value of the first entry e12 is updated to 400(=450-50), the difference value of the wear-out counter value of the first entry e20 is updated to 32 (=82-50), the difference value of the wear-out counter value of the first entry e21 is updated to 200 (=250-50), and the difference value of the wear-out counter value of the first entry e22 is updated to 3 (=53-50). The wear-out information management unit 58 arranges the second entries of the second table 206 in descending order of the difference values, writes a log that is a data set including the first index value of 5 and a difference value of 400 to the second entry e13, writes a log that is a data set including the first index value of 7 and a difference value of 200 to the second entry e14, writes a log that is a data set including the first index value of 0 and a difference value of 100 to the second entry e15, writes a log that is a data set including the first index value of 6 and a difference value of 32 to the second entry e16, writes a log that is a data set including the first index value of 9 and a difference value of 3 to the second entry e17, and writes a log that is a data set including the first index value of 2 and the difference value of 1 to the second entry e18. The number of empty second entries of the second table 206 becomes 0.

Thereafter, the writing of data to the PCM 32 or the reading of data from the PCM 32 is performed several times according to the host write command or the host read command. The wear-out information management unit 58 updates the first table 202 and the second table 206 according to physical addresses notified by the write unit 54 or the read unit 52. FIG. 15A illustrates the updated first table 202. FIG. 15B illustrates the updated second table 206. FIG. 15A illustrates the first table 202 when the wear-out counter value of a first entry e23 having a first index of 8 is updated to 150.

Since the wear-out counter value of the first entry e23 is updated, the difference value is also updated. The difference value of the wear-out counter value of the first entry e23 is updated to 100 (=150-50). The wear-out information management unit 58 is required to write a log that is a data set including the first index value of 8 and a difference of 100 to the second table 206. However, the number of empty second entries of the second table 206 is 0, and the log cannot be written to the second table 206. That is, the wear-out information management unit 58 determines whether there is an empty second entry in the second table 206 before writing the new log to the second table 206. When there is no empty second entry in the second table 206, the wear-out information management unit 58 generates an empty second entry in the second table 206. The wear-out information management unit 58 purges the log stored in the second entry e18 (the data set including the first index value of 2 and the difference value of 1) from the second table 206. The wear-out information management unit 58 writes logs (that is, the data set including the first index value of 6 and the difference value of 32, and the data set including the first index value of 9 and the difference value of 3) that were stored respectively in the second entries e16 and e17, respectively to the second entries e17 and e18. The wear-out information management unit 58 writes the new log that is a data set including the first index value of 8 and a difference value of 100 to the second entry e16 (FIG. 15B).

The order of purging logs from the second table 206 is in ascending order of difference values that the logs store. Accordingly, it is considered that, even if the difference values stored in the logs purged from the second table 206 are lost, this causes a problem rarely. Therefore, the wear-out information management unit 58 does not non-volatilize the logs purged from the second table 206 and deletes the logs from the RAM 30. Accordingly, it is expected to reduce the frequency of the non-volatilization of the difference values.

The wear-out information management unit 58 does not subtract 1, which is the difference value purged from the second table 206, from the wear-out counter value of 51 in the first entry e11 of the first table 202, but remains the wear-out counter value of 51 as it is in the first entry e11. This is because, the wear-out information that is referred to when the wear leveling unit performs the wear leveling process is in the first table 202, and thus it is required to remain the wear-out counter value as it is in order to perform the wear leveling process in accordance with the actual degree of wear-out. In addition, another effect is expected by maintaining the wear-out counter value. The effect will be described later.

When a new log is added to the second table 206, if a rule of arranging the second entries of the second table 206 in descending order of the difference values is strictly followed, it is likely that the log added to the second table 206 is immediately purged from the second table 206, or a log cannot be added to the second table 206 at all. Then, even if a update pattern of the first table 202 changes, logs indicating a state of the first table 202 that is updated many times in the past is maintained in the second table 206 for a while, and thus the logs do not follow the change of the update pattern of the first table 202. Therefore, the difference value of a log may be weighted so that a log added to the second table 206 is not purged for at least a certain period of time. In addition, even if a difference value is smaller than the difference values of all the logs stored in the second table 206, such a log may be added to the second table 206 once.

Next, the writing of data to the PCM 32 or the reading of data from the PCM 32 is performed several times from the state illustrated in FIGS. 15A and 15B. The wear-out information management unit 58 updates the first table 202 and the second table 206 according to physical addresses notified by the write unit 54 or the read unit 52. FIG. 16A illustrates the updated first table 202. FIG. 16B illustrates the updated second table 206. FIG. 16A illustrates the first table 202 when the wear-out counter value of the first entry e12 is updated to 550. The wear-out information management unit 58 updates the difference value of 400 stored in the log of the second entry e13 (the data set including the first index value of 5 and the difference value of 400 illustrated in FIG. 15B) to a difference value of 500. FIG. 16B illustrates an example of the updated second table 206.

The wear-out information management unit 58 updates the first table 202 and the second table 206 and then compares the difference values stored in the logs of the second table 206 with the log non-volatilization threshold value. When it is detected that the difference value stored in a log is equal to or more than the log non-volatilization threshold value, the wear-out information management unit 58 selects a segment of the first table 202 to be non-volatilized and logs of the second table 206. In the same manner as the segment/log method, in one non-volatilization process, the wear-out counter values are non-volatilized for each one segment of the first table 202. The logs of the second table 206 are non-volatilized by a predetermined number in descending order of difference values. Here, an example in which the predetermined number is 2 is provided. In addition, here, the log non-volatilization threshold value is set as 500. In this case, as illustrated in FIG. 16B, if the difference value stored in the log of the second entry e13 is 500, the wear-out information management unit 58 selects the wear-out counter values of the segment A of the first table 202, the log of the second entry e13 of the second table 206, and the log of the second entry e14, as non-volatilization targets. That is, in response to a difference value of a log of one second entry (for example, e13) of the second table 206 being equal to or more than the log non-volatilization threshold value, the log of the one second entry is non-volatilized, and simultaneously a log of a second entry (for example, e14) of which difference value is less than the log non-volatilization threshold value (e.g., the next largest difference value) is also non-volatilized.

A log is non-volatilized for each read/write unit region of the PCM 32, but generally, the size of one second entry is smaller than the capacity of the read/write unit region of the PCM 32. Therefore, by also non-volatilizing a log of which difference value is less than the log non-volatilization threshold value, the size of the non-volatilization of the log can be the same as the capacity of the read/write unit region of the PCM 32. In addition, accordingly, compared with a case where only the log of which difference value is equal to or more than the log non-volatilization threshold value is non-volatilized, an error between the non-volatilized wear-out counter value and the actual wear-out counter value can be minimized as much as possible.

FIGS. 17A to 17D are diagrams for illustrating non-volatilization of wear-out counter values and logs. FIG. 17A illustrates an example of the first table 202 stored in the RAM The first table 202 illustrated in FIG. 17A is the same as the first table 202 illustrated in FIG. 16A. FIG. 17B illustrates an example of the second table 206 stored in the RAM 30 after the logs are non-volatilized. FIG. 17C illustrates an example in which a non-volatilized second table 208 that stores the non-volatilized logs in the PCM 32 (the management information recording region 32b). FIG. 17D illustrates an example of a non-volatilized segment 210 that stores the non-volatilized wear-out counter values in the PCM 32 (the management information recording region 32b).

First, the non-volatilization of logs is described. In the segment/log/difference method, a second entry of the second table 206 stored in the RAM 30 stores a log that stores a data set including a first index value and a difference value. When the second table 206 is non-volatilized, the wear-out information management unit 58 changes the log to store a data set including the first index value and the wear-out counter value, and non-volatilize the logs. The wear-out information management unit 58 selects the two non-volatilized logs in descending order of the stored difference values. The wear-out information management unit 58 selects two logs having large difference values by referring to the second table 206. In the example illustrated in FIG. 16B, the wear-out information management unit 58 selects the log of the second entry e13 (the data set including the first index value of 5 and the difference value of 500) and the log of the second entry e14 (the data set including the first index value of 7 and the difference value of 200). Also, as illustrated in FIG. 17C, the wear-out information management unit 58 writes a data set including the first index value of 5 and a wear-out counter value of 550 as a log 209a, and a data set including the first index value of 7 and a wear-out counter value of 250 as a non-volatilized log 209b, in the non-volatilized second table 208, respectively. The non-volatilized second table 208 includes two non-volatilized second entries. Here, the wear-out information management unit 58 writes the non-volatilized log 209a that is the data set including the first index value of 5 and the wear-out counter value of 550 to a non-volatilized second entry having a second index of 0, and writes the non-volatilized log 209b that is the data set including the first index value of 7 and the wear-out counter value of 250 to a non-volatilized second entry having a second index of 1. FIG. 17C illustrates the non-volatilized second table 208 at this point of time. The order of arranging the non-volatilized second entries in the non-volatilized second table 208 is freely set. For example, the order of arranging the non-volatilized second entries in the non-volatilized second table 208 may be the descending order of the difference values or may be the descending order of the wear-out counter values.

The wear-out information management unit 58 deletes the log of the second entry e13 (the log that stores the data set including the first index value of 5 and the difference value of 500) and the log of the second entry e14 (the log that stores the data set including the first index value of 7 and the difference value of 200), which have been written to the management information recording region 32b as the non-volatilized second table 208, from the second table 206 (FIG. 16B). By this deletion, the information of the difference value is lost. That is, this deletion corresponds to the returning of the difference value to 0 according to the non-volatilization of the wear-out counter value as described in the difference method. Next, the wear-out information management unit 58 writes the logs of the second entries e15 to e18 to the second entries e13 to e16, respectively. The second entries e17 and e18 become empty second entries (FIG. 17B).

With respect to the non-volatilization of the segment, in the same manner as the segment/log method, the wear-out information management unit 58 writes the wear-out counter values stored in one segment indicated by the segment pointer to the management information recording region 32b to non-volatilize the wear-out counter values. Here, for example, the wear-out counter values stored in the segment A are non-volatilized. The wear-out information management unit 58 writes the wear-out counter values of the first entries of the first indexes of 0, 1, 2, and 3 included in the segment A to the non-volatilized first entries of the first indexes of 0, 1, 2, and 3 of the non-volatilized segment 210. FIG. 17D illustrates the non-volatilized segment 210 (the segment A of the non-volatilized first table 202) at this point of time.

The wear-out counter values of the first indexes of 0, 1, 2, and 3 are non-volatilized as the non-volatilized segment 210. Accordingly, logs corresponding to these first indexes are no longer required to be stored in the second table 206.

The wear-out information management unit 58 deletes a log of the second table 206 that stores a first index values of a first entry non-volatilized to the non-volatilized segment 210, from the second table 206. Here, the wear-out information management unit 58 deletes the log stored in the second entry e13 that is the data set including the first index value of 0 (corresponding to the non-volatilized first entry e19) and the difference value of 100, from the second table 206. FIG. 17B illustrates the state in which the log of the second entry e13 is deleted from the second table 206. Accordingly, a larger number of logs can be stored in the second table 206.

Thereafter, when the writing of data to the PCM 32 or the reading of data from the PCM 32 is performed several times, and a difference value that any one log of the second table 206 stores is equal to or more than the log non-volatilization threshold value, operations shown in FIGS. 16A to 17D are repeated.

In the process described with reference to FIGS. 15A and 15B, a log that stores the data set including the first index value of 2 and the difference value of 1 is deleted from the second table 206, but in the process described with reference to FIGS. 17A to 17D, the wear-out counter values stored in the segment A are non-volatilized so that the wear-out counter value of 51 having the first entry e11 is non-volatilized. In this manner, a log that stores a difference value of a read/write unit region corresponding to a certain first index may be deleted without being non-volatilized. However, note that, in the memory system 20, when the non-volatilization process for each segment of the wear-out counter value completes at least one round of the first table 202, the wear-out counter values corresponding to the deleted difference values are necessarily non-volatilized. This is the result of maintaining the wear-out counter value of 51 in the first entry e11 corresponding to the first index value of 2 stored in the deleted log. In this case, compared with a case where some of the difference values stored in the log are purged and deleted from the second table 206, it can be expected that an error between the actual wear-out counter value and the non-volatilized wear-out counter value becomes small.

In case of the random access, wear-out counter values of many read/write unit regions increase, and thus the likelihood that difference values of the wear-out counter values reach the log non-volatilization threshold values is low. Accordingly, the likelihood that the wear-out counter values are non-volatilized as the non-volatilized logs 209a and 209b is low. As a result, all the logs of the second table 206 may be deleted without being non-volatilized. However, in case of the random access, since the wear-out is automatically made uniform throughout the entire user data recording region 32a, the necessity of the wear leveling is low in the first place. Therefore, even if all the logs of the second table 206 are deleted, it is considered that the influence is small.

When a shut-down command or an abnormal power loss event notification is received, the wear-out information management unit 58 non-volatilizes logs at least corresponding to the data size that can be non-volatilized by the PLP. The wear-out information management unit 58 selects logs to be non-volatilized among the logs stored in the second table 206 in descending order of difference values. In the following, a case where the number of entries corresponding to the data size that can be non-volatilized by the PLP is 2 is described. In this case, the wear-out information management unit 58 non-volatilizes the logs by changing the difference values stored therein to the wear-out counter values stored in the first entries of the first table 202, as the non-volatilized logs 209*a* and 209*b*. Accordingly, the wear-out information management unit 58 can non-volatilize the wear-out counter values while reducing errors of the non-volatilized wear-out counter values to the actual wear-out counter values as much as possible.

Note that, if the same procedure is used for both the non-volatilization process during the normal operation and the non-volatilization process when the shut-down command or the abnormal power loss event notification is received, the wear-out information management unit 58 may delete non-volatilized logs (here, two logs) from the second table 206. However, when the power supply to the memory system 20 is cut off, all information stored in the RAM 30 is lost, and thus this deletion process is not essential.

FIGS. 18A to 18D are diagrams illustrating an example of non-volatilization when a shut-down command or an abnormal power loss event notification is received after the non-volatilization described with reference to FIGS. 17A to 17D. The wear-out information management unit 58 selects the log of the second entry e14 (the data set including the first index value of 8 and the difference value of 100) and the log of the second entry e15 (the data set including the first index value of 6 and the difference value of 32). Also, as illustrated in FIG. 18C, the wear-out information management unit 58 writes a data set including the first index value of 8 and a wear-out counter value of 150 as the log 209*a*, and writes a data set including the first index value of 6 and a wear-out counter value of 82 as the non-volatilized log 209*b* to the non-volatilized second table 208, respectively. The wear-out information management unit 58 writes the non-volatilized log 209*a* that is the data set including the first index value of 8 and the wear-out counter value of 150 to the non-volatilized second entry of the second index of 0 and writes the non-volatilized log 209*b* that is the data set including the first index value of 6 and the wear-out counter value of 82 to the non-volatilized second entry of the second index of 1. FIG. 18C illustrates the non-volatilized second table 208 at this point of time. The order of arranging the non-volatilized second entries in the non-volatilized second table 208 is freely set.

The wear-out information management unit 58 deletes the log of the second entry e14 (the log that stores the data set including the first index value of 8 and the difference value of 100) written to the management information recording region 32*b* as the non-volatilized second table 208 and the log of the second entry e15 (the log that stores the data set including the first index value of 6 and the difference value of 32), from the second table 206 (FIG. 17B).

In addition, when the shut-down command is received, the data size that can be non-volatilized is not limited based on the power supply capability of the backup power supply 28, and thus compared with a case where the abnormal power loss event notification is received, more logs may be non-volatilized. Accordingly, compared with the case where the abnormal power loss event notification is received, an error of the non-volatilized wear-out counter value to the actual wear-out counter value can be further minimized.

The restoration process when the memory system 20 starts up is the same as the segment/log method illustrated in FIG. 10B.

Figure 19:
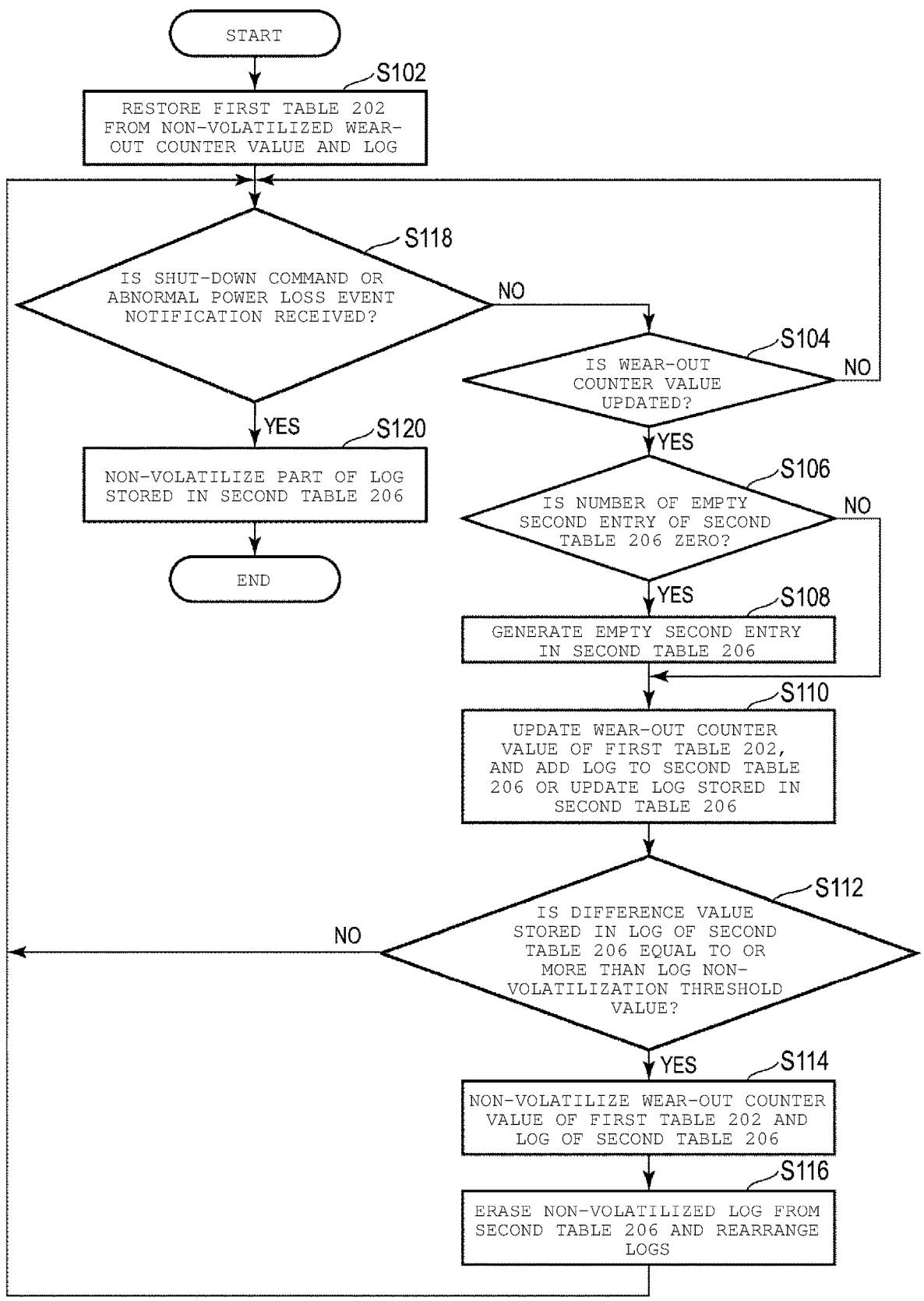
FIG. 19 is a flowchart illustrating an example of a procedure of non-volatilization and restoration of wear-out information in the segment/log/difference method according to the embodiment.

FIG. 19 is a flowchart illustrating an example of a procedure of non-volatilization and restoration of wear-out information in the segment/log/difference method according to the embodiment.

When the memory system 20 starts up, the wear-out information restoration unit 62 reads a non-volatilized wear-out counter value from the non-volatilized segment 210 and reads a non-volatilized log from the non-volatilized second table 208. The wear-out information restoration unit 62 restores the first table 202 from the read wear-out counter value and the log (Step S102). The restoration procedure is the same as the procedure described, for example, with reference to FIG. 10B.

The wear-out information management unit 58 determines whether a shut-down command or an abnormal power loss event notification is received (Step S118).

When the shut-down command or the abnormal power loss event notification is received (YES in Step S118), the wear-out information management unit 58 non-volatilizes a part of logs stored in the second table 206 (Step S120). The wear-out information management unit 58 changes a difference value to a wear-out counter value when the log is non-volatilized. The wear-out information management unit 58 selects the non-volatilized logs in descending order of difference values. The number of non-volatilized logs when the abnormal power loss event is notified may be designed according to the power supply capability of the backup power supply 28. The number of logs that are non-volatilized when the shut-down command is received may be larger than the number of logs that are non-volatilized when the abnormal power loss event is notified. Thereafter, the operation of the memory system 20 stops.

When the shut-down command or the abnormal power loss event notification is not received (NO in Step S118), the wear-out information management unit 58 determines whether a wear-out counter value is updated (Step S104). The wear-out counter value is updated, for example, by the writing of data to the PCM 32 with a host write command or by the reading of data from the PCM 32 with a host read command.

When the wear-out counter value is updated (YES in Step S104), the wear-out information management unit 58 determines whether the number of empty second entries of the second table 206 is 0 (Step S106).

When the number of empty second entries of the second table 206 is 0 (YES in Step S106), the wear-out information management unit 58 purges a log stored in a second entry from the second table 206 and generates an empty second entry in the second table 206 (Step S108). At this time, the log purged from the second table 206 is, for example, a log having the minimum difference value.

When the number of empty second entries of the second table 206 is not 0 (NO in Step S106), or after Step S108, the wear-out information management unit 58 updates a wear-out counter value of the first table 202, and adds a log to the second table 206 or updates a log (more specifically, a difference value of a log) stored in the second table 206 (Step S110). Note that, in case of updating the log stored in the second table 206, the wear-out information management unit 58 may omit processes of Steps S106 and S108. When a log is added to the second table 206, the wear-out information management unit 58 may cause the added log not to be purged for a certain period of time.

The wear-out information management unit 58 determines whether a difference value stored in a log of the second table 206 is equal to or more than the log non-volatilization threshold value (Step S112).

When the difference value stored in the log of the second table 206 is equal to or more than the log non-volatilization threshold value (YES in Step S112), the wear-out information management unit 58 writes the wear-out counter values of one segment of the first table 202 to the non-volatilized first segment 210 of the PCM 32 and writes a predetermined number of logs of entries of the second table 206 to the non-volatilized second table 208 of the PCM 32 (Step S114). The non-volatilized segment is a segment indicated by the segment pointer. When the log is written to the non-volatilization second table 208, the wear-out information management unit 58 changes the difference value to the wear-out counter value. The predetermined number of non-volatilized logs are logs of which difference values are equal to or more than the log non-volatilization threshold value and other logs selected in descending order of the difference values.

The wear-out information management unit 58 deletes logs corresponding to the non-volatilized wear-out counter values and the non-volatilized logs, from the second table 206 and rearranges the logs (Step S116). The wear-out information management unit 58 rearranges, for example, the logs in descending order of the difference values.

When the difference value stored in the log of the second table 206 is less than the log non-volatilization threshold value (NO in Step S112), the wear-out information management unit 58 performs the determination of Step S118 again.

When the wear-out counter value is not updated (NO in Step S104), the wear-out information management unit 58 determines whether the shut-down command or the abnormal power loss event notification is received again (Step S118).

Partial-or-Whole Cache/Difference Method

FIGS. 20A to 25C are diagrams illustrating non-volatilization of the wear-out counter value in the partial-or-whole cache/difference method. In the same manner as the partial-or-whole cache method, also in this method, the management information recording region 32b includes regions for storing wear-out counter values of all the read/write unit regions of the PCM 32. This region is referred to as a non-volatilized table 126 (FIG. 20C). The non-volatilized table 126 corresponds to the non-volatilized table 116 in the partial-or-whole cache method (FIG. 11C). Detailed descriptions of the structures and actions of the non-volatilized table 126 which are the same as those of the non-volatilization table 116 are omitted.

Figures 20A, 20B, 20C:
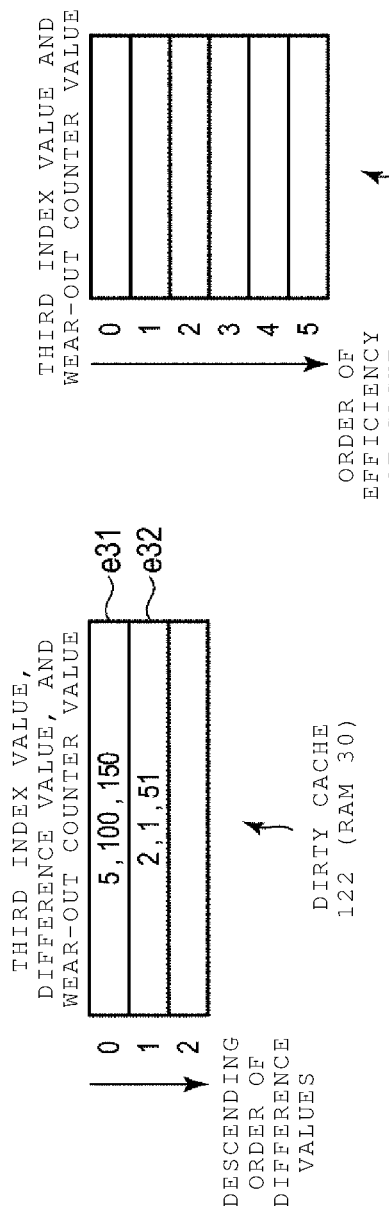
FIGS. 20A to 20C are diagrams illustrating an example of non-volatilization in a partial-or-whole cache/difference method according to the embodiment.

A cache of the RAM 30 is divided into a dirty cache 122 (FIG. 20A) and a clean cache 124 (FIG. 20B). The dirty cache 122 corresponds to the dirty cache 112 in the partial-or-whole cache method (FIG. 11A). Detailed descriptions of the structures and actions of the dirty cache 122 which are the same as those of the dirty cache 112 are omitted. The clean cache 124 corresponds to the clean cache 114 of the partial-or-whole cache method (FIG. 11B). Detailed descriptions of the structures and actions of the clean cache 124 which are the same as those of the clean cache 114 are omitted. In the partial-or-whole cache method, the wear-out information management unit 58 arranges the fourth entries of the dirty cache 112 in descending order of cache efficiency. Meanwhile, in the partial-or-whole cache/difference method, the fourth entries of the dirty cache 122 include difference values. In the partial-or-whole cache/difference method, the wear-out information management unit 58 arranges the fourth entries of the dirty cache 122 in descending order of the difference values.

Unlike the partial-or-whole cache method, a wear-out counter value of a certain third index stored in a data-storing fifth entry of the clean cache 114 is not limited to be necessarily the same as the wear-out counter value stored in the third entry of the corresponding third index of the non-volatilized table 126. Specific examples thereof are described below with reference to FIGS. 22A to 22C. However, when a shut-down command or an abnormal power loss event notification is received, the wear-out information management unit 58 does not non-volatilize data of the clean cache 124.

At a certain timing, wear-out counter values of all the third entries of the non-volatilized table 126 are set as 50. As the reading and writing proceeds to the PCM 32, for example, a wear-out counter value having a third index of 5 is updated to 150 so that the difference value becomes 100, and a wear-out counter value having a third index of 2 is updated to 51 so that the difference value becomes 1. The updated wear-out counter values are written to the dirty cache 122. For writing the updated values, when a wear-out counter value is updated, the wear-out information management unit 58 determines whether the dirty cache 122 includes an empty fourth entry. When the dirty cache 122 includes an empty fourth entry, the wear-out information management unit 58 writes a data set including a third index value of 5, a difference value of 100, and a wear-out counter value of 150 to a fourth entry e31 having a fourth index of 0, and writes a data set including a third index value of 2, a difference value of 1, and a wear-out counter value of 51 to a fourth entry e32 of a fourth index of 1, in order to arrange fourth entries of the dirty cache 122 in descending order of the difference values. FIG. 20A illustrates the dirty cache 122 stored in the RAM 30 at this point of time.

FIG. 20B illustrates the clean cache 124 stored in the RAM 30 at this point of time. At this point of time, the clean cache 124 is in an empty state.

FIG. 20C illustrates the non-volatilized table 126 stored in the management information recording region 32b at this point of time. Here, it is assumed that non-volatilization is not performed after the certain timing described above, and the wear-out counter values of all the third entries of the non-volatilized table 126 are 50 without change.

As the reading and writing proceeds to the PCM 32, for example, a wear-out counter value having the third index of 5 is updated to 450 so that the difference value becomes 400, a wear-out counter value having a third index of 11 is updated to 250 so that the difference value becomes 200. In order to arrange fourth entries of the dirty cache 122 in descending order of the difference values, the wear-out information management unit 58 updates a difference value of 100 stored in the fourth entry e31 having the fourth index of 0, to 400, updates the wear-out counter value of 150 to 450, shifts data of the fourth entry e32 having the fourth index of 1 (i.e., the third index value of 2, the difference value of 1, and the wear-out counter value of 51) to a fourth entry e33 having a fourth index of 2, and writes a data set including a third index value of 11, a difference value of 200, and a wear-out counter value of 250 to the fourth entry e32. FIG. 21A illustrates the dirty cache 122 at this point of time.

FIG. 21B illustrates the clean cache 124 at this point of time. At this point of time, the clean cache 124 is still in an empty state.

FIG. 21C illustrates the non-volatilized table 126 at this point of time. Here, it is assumed that non-volatilization is not performed after the certain timing described above, and thus the wear-out counter values of all the third entries of the non-volatilized table 126 are still 50 without change.

As the reading and writing to the PCM 32 further proceeds, a wear-out counter value of a read/write unit region corresponding to a third entry having a third index of 14 is updated to 150 and the difference value becomes 100. The wear-out information management unit 58 determines whether the dirty cache 122 includes an empty fourth entry. When the dirty cache 122 does not include an empty fourth entry, the wear-out information management unit 58 purges the data of the fourth entry e33 (i.e., the third index value of 2, the difference value of 1, and the wear-out counter value of 51 illustrated in FIG. 21A), from the dirty cache 122, generates an empty fourth entry (the fourth entry e33), and writes a data set including a third index value of 14, a difference value of 100, and a wear-out counter value of 150 to the generated empty the fourth entry e33. FIG. 22A illustrates the dirty cache 122 at this point of time.

The wear-out counter value of 51 in the data set of the fourth entry e33 (the third index value of 2, the difference value of 1, and the wear-out counter value of 51) purged from the dirty cache 122 is not non-volatilized to the non-volatilized table 126 in the management information recording region 32b. The order of fourth entries purged from the dirty cache 122 is an ascending order of difference values, and thus it is considered that, even if a wear-out counter value of the fourth entry purged from the dirty cache 122 is not non-volatilized, it causes a problem rarely. Accordingly, it is expected that the frequency of non-volatilization decreases.

However, generally, data access locality is expected, and it is considered that the likelihood that a wear-out counter value of a fourth entry purged from the dirty cache 122 is accessed in the near future is relatively high. In particular, in the partial cache/difference method, if a wear-out counter value of a fourth entry purged from the dirty cache 122 is discarded, when the corresponding wear-out counter value is accessed again, it is required to read the wear-out counter value from the non-volatilized table 126 in the management information recording region 32b, and thus the penalty is great.

Thus, the wear-out counter value of the fourth entry purged from the dirty cache 122 is added to the clean cache 124. Here, the fifth entries of the clean cache 124 do not include difference values. Therefore, the wear-out information management unit 58 deletes a difference value included in the data of the entry purged from the dirty cache 122 and writes it to the clean cache 124. With respect to the example of FIGS. 22A to 22C, the wear-out information management unit 58 discards the difference value of 1 included in the data of the fourth entry purged from the dirty cache 122 and writes a data set including a third index value of 2 and a wear-out counter value of 51 to a fifth entry e41 having a fifth index of 0 of the clean cache 124. In this manner, by storing a part of data stored in a fourth entry purged from the dirty cache 122 into a fifth entry of the clean cache 124, it is possible to deal with data access locality. Note that, in this manner, when a part of data stored in a fourth entry, which was purged from the dirty cache 122, is stored in a fifth entry of the clean cache 124, the wear-out counter value stored in the fifth entry may not be the same as the wear-out counter value stored in the third entry having the corresponding third index of the non-volatilized table 126. Still another effect is expected by storing a part of data stored in a fourth entry, which was purged from the dirty cache 122, in the clean cache 124. This effect will be described later. FIG. 22B illustrates the clean cache 124 at this point of time.

FIG. 22C illustrates the non-volatilized table 126 at this point of time. Here, it is also assumed that non-volatilization is not performed after the certain timing described above, and thus the wear-out counter values of all the third entries of the non-volatilized table 126 are still 50 without change.

In the same manner as the segment/log/difference method, when a difference value of the updated wear-out counter value is added to the dirty cache 122 together with the third index value and the wear-out counter value, if a rule of arranging the fourth entries of the dirty cache 122 in descending order of the difference values is strictly followed, even if a difference value is added to the dirty cache 122, the difference value is immediately purged from the dirty cache 122, or the likelihood that a difference value cannot be added to the dirty cache 122 at all is considered. Accordingly, in the same manner as the segment/log/difference method, it is considered that a way to cause a difference value added to the dirty cache 122 to be kept in the dirty cache 122 together with a third index value and a wear-out counter value for a certain period of time, is required. For example, a difference value may be weighted so that data (that is, a data set including a third index value, a difference value, and a wear-out counter value) added to the dirty cache 122 is not purged for at least a certain period of time.

Next, it is assumed that the reading and writing to the PCM 32 further proceeds from the state illustrated in FIGS. 22A to 22C, and the wear-out counter value of the read/write unit region corresponding to the third entry having the third index of 5 became 550 (i.e., the difference value is 500). The wear-out information management unit 58 updates the difference value of 400 (FIG. 22A) of the fourth entry e31 of the dirty cache 122, which stores the third index value of 5, to 500, and updates the wear-out counter value of 450 to 550.

The wear-out information management unit 58 updates the wear-out counter value of 450 to 550 and then compares the difference values stored in the fourth entries e31, e32, and e33 with a dirty cache non-volatilization threshold value. If it is detected that the difference value stored in any one of the fourth entries e31, e32, and e33 is equal to or more than the dirty cache non-volatilization threshold value, the wear-out information management unit 58 performs non-volatilization. For example, when the dirty cache non-volatilization threshold value is 500, if the difference value stored in the fourth entry e31 is updated to 500, the wear-out information management unit 58 writes the wear-out counter value of 550 stored in the fourth entry e31 to a third entry e43 having a third index of 5 of the non-volatilized table 126 to non-volatilize the wear-out counter value. FIG. 23C illustrates the non-volatilized table 126 at this point of time.

Simultaneously with the non-volatilization, the wear-out information management unit 58 deletes the data of the non-volatilized fourth entry e31 (the data set including the third index value of 5, the difference value of 500, and the wear-out counter value of 550), from the dirty cache 122. The difference value is lost by this deletion. That is, this deletion corresponds to the returning of the difference value to 0 according to the non-volatilization of the wear-out counter value as described above in the difference method. The wear-out information management unit 58 shifts the data of the fourth entry e32 (the data set including the third index value of 11, the difference value of 200, and the wear-out counter value of 250) and the data of the fourth entry e33 (the data set including the third index value of 14, the difference value of 100, and the wear-out counter value of 150), to the fourth entries e31 and e32, respectively. The fourth entry e33 of the dirty cache 122 becomes an empty fourth entry. FIG. 23A illustrates the dirty cache 122 at this point of time.

Further, simultaneously with the non-volatilization, the wear-out information management unit 58 writes a data set including a third index value of 5 and a wear-out counter value of 550 stored in the non-volatilized fourth entry e31 to the fifth entry e41 having the fifth index of 0 of the clean cache 124 to use the data set as the fifth entry of the clean cache 124. In this manner, when a part of data stored in a fourth entry of the non-volatilized dirty cache 122 is stored in a fifth entry of the clean cache 124, the wear-out counter value stored in the fifth entry of the clean cache 124 becomes the same as the wear-out counter value stored in a third entry of the corresponding third index of the non-volatilized table 126.

The wear-out information management unit 58 arranges the fifth entries of the clean cache 124 in descending order of efficiency. An example of descending order of efficiency is a least recently used (LRU) order. The wear-out information management unit 58 arranges the fifth entries of the clean cache 124 in descending order of time (i.e., from new to old) representing when the stored wear-out counter value was last accessed or added to the clean cache 124. In performing the wear leveling, the wear leveling unit 60 determines the necessity of the wear leveling by referring to the wear-out counter value stored in the dirty cache 122 or the clean cache 124.

More specifically, the wear-out information management unit 58 writes the data set including the third index value of 5 and the wear-out counter value of 550 to the fifth entry e41 having the fifth index of 0 of the clean cache 124. The wear-out information management unit 58 writes the data set including the third index value of 2 and the wear-out counter value of 51 stored in the fifth entry e41 having the fifth index of 0 of the clean cache 124, to a fifth entry e42 having a fifth index of 1 of the clean cache 124. FIG. 23B illustrates the clean cache 124 at this point of time.

In addition, if all six fifth entries of the clean cache 124 store valid data, the clean cache 124 is in a full state. If it is required to further write data (that is, a data set including a third index value and a wear-out counter value) from the dirty cache 122 to the clean cache 124, the wear-out information management unit 58 determines whether the clean cache 124 includes an empty fifth entry. When the clean cache 124 does not include an empty fifth entry, the wear-out information management unit 58 purges data of any one of the data-storing fifth entries of the clean cache 124, from the clean cache 124, and causes the data-storing fifth entry to be an empty fifth entry. The purged data is, for example, data of a fifth entry of which the most recently accessed time is the oldest.

It is assumed that the reading and writing to the PCM 32 further proceeds from the state illustrated in FIGS. 23A to 23C, and the wear-out counter value of the read/write unit region corresponding to the third index value of 2 stored in the fifth entry e42 of the clean cache 124 becomes 52 (that is, the difference value from the wear-out counter value of 51 stored in the fifth entry e42 of the clean cache 124 is 1). The wear-out information management unit 58 moves data including the data of the fifth entry e42 of the clean cache 124 (the data set including the third index value of 2 and the wear-out counter value of 51) and the difference value of 1, to a fourth entry of the dirty cache 122. When the data of the fifth entry e42 is moved, the wear-out information management unit 58 reflects a state in which the wear-out counter value is updated from 51 to 52. The wear-out information management unit 58 moves the data set including the third index value of 2, the difference value of 1, and the wear-out counter value of 52, to the dirty cache 122. Since the difference value of 1 is smaller than the difference values (that is, 200 and 100) stored in the fourth entries e31 and e32 of the dirty cache 122, the wear-out information management unit 58 writes the data set including the third index value of 2, the difference value of 1, and the wear-out counter value of 52, to the fourth entry e33 of the dirty cache 122. FIG. 24A illustrates the dirty cache 122 at this point of time. The wear-out information management unit 58 deletes the data of the fifth entry e42 (the data set including the third index value of 2 and the wear-out counter value of 51), which was moved to the dirty cache 122, from the clean cache 124. FIG. 24B illustrates the clean cache 124 at this point of time. FIG. 24C illustrates the non-volatilized table 126 at this point of time.

By the way, the data set including the third index value of 2 and the wear-out counter value of 51 stored in the fifth entry e42 (FIG. 23B) of the clean cache 124 is a part of the data (the data set including the third index value of 2, the difference value of 1, and the wear-out counter value of 51) purged from the fourth entry e33 (FIG. 21A) of the dirty cache 122.

When the difference value of 1 is purged from the fourth entry e33 of the dirty cache 122 and written to the fifth entry e42 of the clean cache 124, the difference value of 1 is discarded and is not non-volatilized. However, the wear-out counter value of 51 updated from the wear-out counter value of 50 stored in the third entry of the third index of 2 of the non-volatilized table 126 is stored in the fifth entry e42 of the clean cache 124 (FIG. 23B).

Therefore, if data (e.g., the wear-out counter value of 51) purged from the dirty cache 122 and written to the clean cache 124 is updated (e.g., updated from the wear-out counter value of 51 to 52) when being moved from the clean cache 124 to the dirty cache 122, this means that the wear-out counter value of 52 including the previous updated amount is written to the dirty cache 122.

If the wear-out counter value corresponding to the third index of 2 thereafter becomes a candidate for non-volatilization, that is, a difference value corresponding to the third index value of 2 stored in the fourth entry of the dirty cache 122 is equal to or more than the dirty cache non-volatilization threshold value, the wear-out counter value corresponding to the third index value of 2 is non-volatilized. At this point of time, a wear-out counter value corresponding to the third index value of 2 (a wear-out counter value of which the difference value is equal to or more than the dirty cache non-volatilization threshold value) is non-volatilized, and this non-volatilization includes the previous update (that is, update from the wear-out counter value of 50 to 51) of the wear-out counter value corresponding to the third index value of 2, which was not non-volatilized when previously purged from the dirty cache 122 and written to the clean cache 124. Accordingly, an error between the actual wear-out counter value and the non-volatilized wear-out counter value becomes 0, and thus can be expected to be smaller than the difference value of 1 (a difference from 50 to 51) of the wear-out counter value that is not non-volatilized when being purged from the dirty cache 122 and written to the clean cache 124. Accordingly, an effect of improving wear leveling accuracy is exhibited.

It is noted that, this effect can be obtained only when: (Condition 1) a wear-out counter value purged from the dirty cache 122 and moved to the clean cache 124 is updated before being purged from the clean cache 124 since the clean cache 124 is full and is further moved from the clean cache 124 to the dirty cache 122; and (Condition 2) a difference value after being further moved from the clean cache 124 to the dirty cache 122 is equal to or more than the dirty cache non-volatilization threshold value.

In particular, in case of the whole cache/difference method, the capacity obtained by combining the capacity of the dirty cache 122 and the capacity of the clean cache 124 is the same as the capacity of the non-volatilized table 126, and thus the entire non-volatilized table 126 is cached in the RAM 30. Therefore, since entries are not purged from the clean cache 124, at least Condition 1 described above is satisfied. Therefore, in case of the whole cache/difference method, compared with the partial cache/difference method, it is more likely that an error between the actual wear-out counter value and the non-volatilized wear-out counter value becomes smaller.

In the same manner as the segment/log/difference method, in case of random access, the likelihood that the difference value of the wear-out counter value of each read/write unit region reaches the dirty cache non-volatilization threshold value is low. Therefore, there is less or no likelihood that all the fourth entries of the dirty cache 122 are non-volatilized. As a result, all the fourth entries of the dirty cache 122 are not non-volatilized and may be deleted. However, the random access automatically makes uniform the wear-out throughout the entire PCM 32, and thus necessity of the wear leveling is low in the first place. Even if all the fourth entries of the dirty cache 122 are deleted, it is considered that the influence is small.

When a shut-down command or an abnormal power loss event notification is received, the wear-out information management unit 58 overwrites the wear-out counter values stored in the fourth entries of the dirty cache 122 in descending order of the difference values by the number of entries at least corresponding to the data size that can be non-volatilized by the PLP, to the third entries of the non-volatilized table 126 in the management information recording region 32*b* to non-volatilize the wear-out counter values. Here, the number of entries corresponding to the data size that can be non-volatilized by the PLP is 2.

FIGS. 25A to 25C are diagrams illustrating an example of the non-volatilization of the wear-out counter value when a shut-down command or an abnormal power loss event notification is received after the non-volatilization described with reference to FIGS. 24A to 24C. The wear-out information management unit 58 writes the wear-out counter value of 250 (the third index value of 11) stored in the fourth entry e31 of the dirty cache 122 (FIG. 24A) to a third entry e44 having an index value of 11 in the non-volatilized table 126 (FIG. 25C) in the management information recording region 32*b*. In addition, the wear-out information management unit 58 writes the wear-out counter value of 150 (the third index value of 14) stored in the fourth entry e32 of the dirty cache 122 (FIG. 24A) to a third entry of e45 having an index value of 14 of the non-volatilized table 126 (FIG. 25C) in the management information recording region 32*b*.

Note that, if the same procedure is used for both the non-volatilization process during the normal operation and the non-volatilization process when the shut-down command or the abnormal power loss event notification is received, the wear-out information management unit 58 may delete data of the non-volatilized fourth entry from the dirty cache 122. It is noted that, when the power supply to the memory system 20 is cut off, all information stored in the RAM 30 is lost, and thus the deletion process is not essential. In addition, when the shut-down command is received, since the data size that can be non-volatilized is not limited based on the power supply capability of the backup power supply 28, compared with a case where the abnormal power loss event notification is received, more fourth entries may be non-volatilized. Accordingly, compared with a case where the abnormal power loss event notification is received, an error of the non-volatilized wear-out counter value to the actual wear-out counter value can be further minimized.

The restoration process when the memory system 20 starts up is the same as the partial-or-whole cache method.

Figure 26:
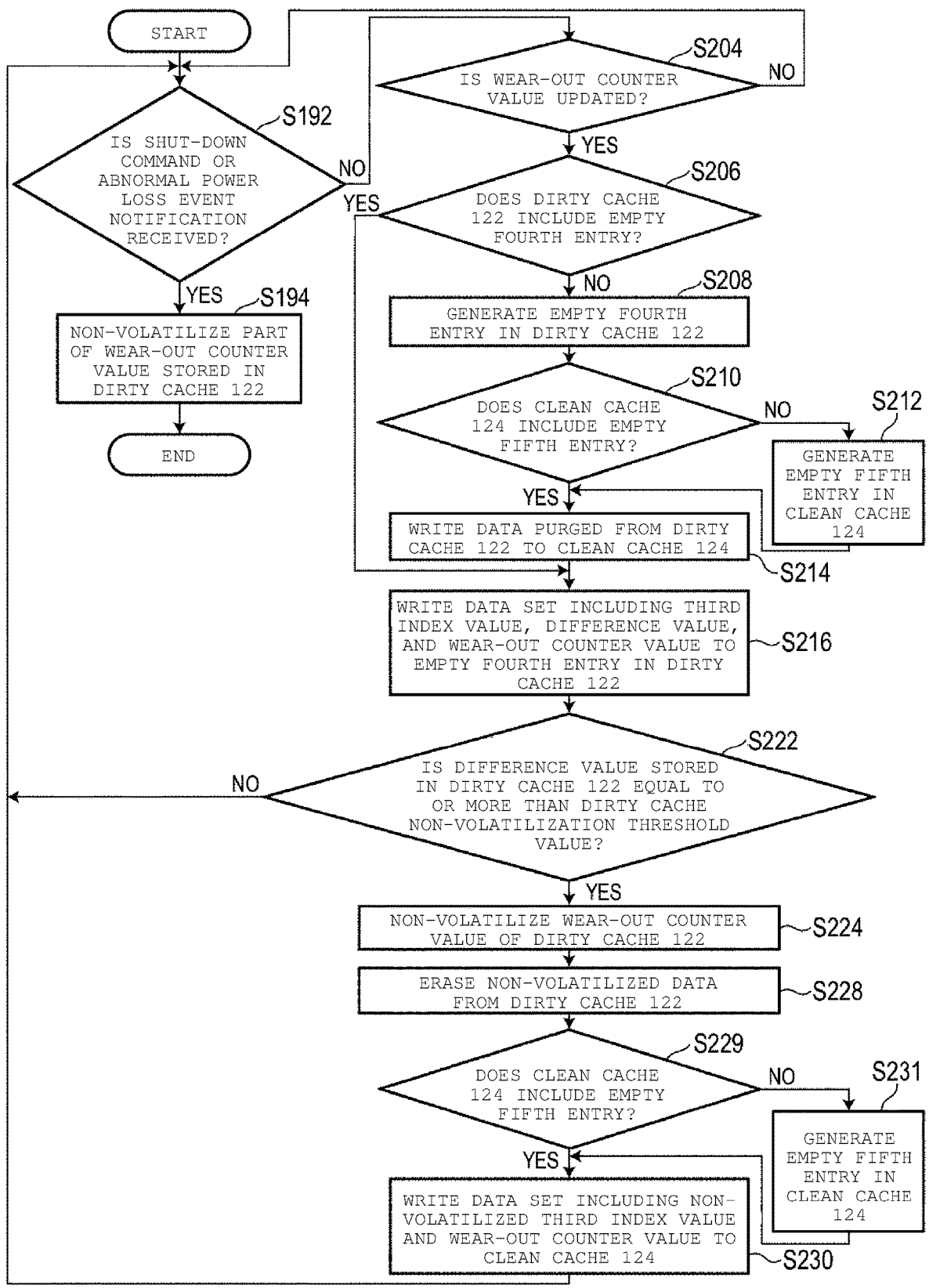
FIG. 26 is a flowchart illustrating an example of a procedure of non-volatilization of wear-out information in the partial-or-whole cache/difference method according to the embodiment.

FIG. 26 is a flowchart illustrating an example of a procedure of the non-volatilization of the wear-out information in the partial-or-whole cache/difference method according to the embodiment.

The wear-out information management unit 58 determines whether a shut-down command or an abnormal power loss event notification is received (Step S192).

When a shut-down command or an abnormal power loss event notification is received (YES in Step S192), the wear-out information management unit 58 non-volatilizes a part of the wear-out counter value stored in the fourth entry of the dirty cache 122 (Step S194). The wear-out information management unit 58 selects the wear-out counter values to be non-volatilized in descending order of the difference values. The number of non-volatilized wear-out counter values selected in this manner when the abnormal power loss event is notified can be freely designed according to the power supply capability of the backup power supply 28. The number of fourth entries non-volatilized when a shut-down command is received may be larger than the number of fourth entries non-volatilized when the abnormal power loss event is notified. Thereafter, the operation of the memory system 20 stops.

When a shut-down command or an abnormal power loss event notification is not received (NO in Step S192), the wear-out information management unit 58 determines whether a wear-out counter value is updated (Step S204). The wear-out counter value is updated, for example, by the writing of data to the PCM 32 with a host write command or the reading of data from the PCM 32 with a host read command.

When a wear-out counter value is updated (YES in Step S204), the wear-out information management unit 58 determines whether the dirty cache 122 includes an empty fourth entry (Step S206).

When the dirty cache 122 does not include an empty fourth entry (NO in Step S206), the wear-out information management unit 58 purges data of a fourth entry that stores the smallest difference value, from the dirty cache 122 and generates the empty fourth entry in the dirty cache 122 (Step S208).

The wear-out information management unit 58 writes data purged from the dirty cache 122 to the clean cache 124 without non-volatilizing the data. Before the writing, the wear-out information management unit 58 determines whether the clean cache 124 includes an empty fifth entry (Step S210).

When the clean cache 124 does not include an empty fifth entry (NO in Step S210), the wear-out information management unit 58 purges data of a certain data-storing fifth entry from the clean cache 124 to generate an empty fifth entry (Step S212). The purged data is data of a fifth entry of which the recently referred time is the oldest among the data-storing fifth entries.

When the clean cache 124 includes the empty fifth entry (YES in Step S210) or after Step S212, the wear-out information management unit 58 writes data purged from the dirty cache 122 to the clean cache 124 (S214). The wear-out information management unit 58 writes data other than the difference value, among the data purged from the dirty cache 122, to the clean cache 124.

When the dirty cache 122 includes an empty fourth entry (YES in Step S206) or after Step S214, the wear-out information management unit 58 writes a data set including a third index value, a difference value, and a wear-out counter value to the empty fourth entry of the dirty cache 122 (Step S216).

The wear-out information management unit 58 determines whether a difference value stored in a fourth entry of the dirty cache 122 is equal to or more than the dirty cache non-volatilization threshold value (Step S222).

When a difference value stored in a fourth entry of the dirty cache 122 is equal to or more than the dirty cache non-volatilization threshold value (YES in Step S222), the wear-out information management unit 58 writes the wear-out counter value stored in the fourth entry to the non-volatilized table 126 (Step S224).

The wear-out information management unit 58 deletes data of the non-volatilized fourth entry (that is, a data set including a third index value, a difference value, and a wear-out counter value) from the dirty cache 122 to generate an empty fourth entry (Step S228). The wear-out information management unit 58 shifts data of the other fourth entries.

The wear-out information management unit 58 determines whether the clean cache 124 includes an empty fifth entry (Step S229).

When the clean cache 124 does not include an empty fifth entry (NO in Step S229), the wear-out information management unit 58 purges data of a certain data-storing fifth entry from the clean cache 124 to generate an empty fifth entry (Step S231). The purged data is data of a fifth entry of which the most recent access time is the oldest, among the data storing fifth entries.

When the clean cache 124 includes an empty fifth entry (YES in Step S229) or after Step S231, the wear-out information management unit 58 writes a data set including a third index value and a wear-out counter value stored in the non-volatilized fourth entry to a fifth entry of the clean cache 124 (Step S230).

When a difference value stored in a fourth entry of the dirty cache 122 is less than the dirty cache non-volatilization threshold value (NO in Step S222) or after Step S230, the wear-out information management unit 58 determines whether a shut-down command or an abnormal power loss event notification is received again (S192).

While certain embodiments have been described, these embodiments have been presented by way of example only, and are not intended to limit the scope of the disclosure. Indeed, the novel embodiments described herein may be implemented in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory that includes a plurality of regions;
a volatile memory; and
a controller that is connected to the nonvolatile memory and the volatile memory, wherein the controller is configured to:
store in the volatile memory a plurality of first counter values each indicating the number of times each of the plurality of regions has been accessed, and a plurality of second counter values respectively corresponding to the plurality of first counter values and indicating differences between values of the plurality of first counter values currently most recently non-volatilized to the nonvolatile memory, and
write the first counter value of a first region of the plurality of regions to the nonvolatile memory in response to the second counter value of the first region being equal to or more than a threshold value.

2. The memory system according to claim 1, wherein the controller is further configured to:
delete the second counter value of the first region from the volatile memory in response to the second counter value of the first region being equal to or more than the threshold value and the first counter value of the first region being written to the nonvolatile memory.

3. The memory system according to claim 1, wherein the controller is further configured to:
update the second counter value of a second region of the plurality of regions, which is stored in the volatile memory, in response to the number of times the second region has been accessed being updated.

4. The memory system according to claim 1, wherein the controller is further configured to:
write the second counter value of a second region of the plurality of regions to the volatile memory, in response to the number of times the second region has been accessed being updated and the second counter value of the second region being not already stored in the volatile memory.

5. The memory system according to claim 1, wherein the controller is further configured to:
delete a smallest second counter value among the plurality of second counter values that are stored in the volatile memory, and write the second counter value of a second region of the plurality of regions to the volatile memory, in response to the number of times the second region has been accessed being updated, the second counter value of the second region being not already stored in the volatile memory, and the number of second counter values stored in the volatile memory being at a maximum.

6. The memory system according to claim 1, wherein the nonvolatile memory is a rewritable memory and the first counter values respectively indicate the number of times the plurality of regions has been accessed for either a read or a write.

7. The memory system according to claim 6, wherein the first counter value for a region is increased by a first value in response to a read access to the region and by a second value larger than the first value in response to a write access to the region.

8. The memory system according to claim 1, wherein the controller is further configured to:
write a group of the first counter values to the nonvolatile memory in response to the second counter value of the first region being equal to or more than the threshold value.

9. The memory system according to claim 8, wherein the controller is further configured to:
write a different group of the first counter values to the nonvolatile memory in response to one of the second counter values being equal to or more than the threshold value, after writing the group of the first counter values to the nonvolatile memory and deleting the second counter value of the first region from the volatile memory.

10. The memory system according to claim 1, wherein
one of the second counter values corresponding to one of the first counter values is reset to zero in response to the corresponding first counter value being written to the nonvolatile memory.

11. A memory system comprising:
a nonvolatile memory that includes a plurality of regions;
a volatile memory; and
a controller that is connected to the nonvolatile memory and the volatile memory, wherein the controller is configured to:
store in the volatile memory a plurality of first counter values each indicating the number of times each of the plurality of regions has been accessed and a plurality of second counter values respectively corresponding to the plurality of first counter values, and
write the first counter values of first regions of the plurality of regions to the nonvolatile memory in response to power supply to the memory system being cut off,
the first regions are a subset of the plurality of regions, and the second counter values corresponding to the first counter values of the first regions are larger than other second counter values stored in the volatile memory, and
one of the second counter values corresponding to one of the first counter values is reset to zero in response to the corresponding first counter value being written to the nonvolatile memory.

12. The memory system according to claim 11, wherein the nonvolatile memory is a rewritable memory and the first counter values respectively indicate the number of times the plurality of regions has been accessed for either a read or a write.

13. The memory system according to claim 11, further comprising:
a backup power supply,
wherein the backup power supply is sized so that, when fully charged, it has sufficient capacity to write all of the first counter values of the first regions to the nonvolatile memory.

14. The memory system according to claim 13, wherein the controller is further configured to:
write the first counter values of the first regions to the nonvolatile memory in response to the power supply to the memory system being cut off without a shut-down command, and
write the first counter values of the first regions and one or more second regions of the plurality of regions to the nonvolatile memory in response to the power supply to the memory system being cut off according to the shut-down command.

15. A memory system comprising:
a nonvolatile memory that includes a plurality of regions;
a volatile memory configured with a first cache and a second cache; and
a controller that is connected to the nonvolatile memory and the volatile memory, wherein the controller is configured to:
store in the first cache a plurality of first entries, each of the first entries including a region identifier and a counter value indicating the number of times a region corresponding to the region identifier has been accessed, and in the second cache a plurality of second entries, each of the second entries including a region identifier, a first counter value indicating the number of times a region corresponding to the region identifier has been accessed, and a second counter value indicating a difference between the first counter value and the counter value for the region corresponding to the region identifier that has been written to the nonvolatile memory, and
write the first counter value of a first region of the plurality of regions stored in the second cache to the nonvolatile memory in response to the second counter value of the first region being equal to or more than a threshold value.

16. The memory system according to claim 15, wherein the controller is further configured to:
store in the first cache a new entry that includes the region identifier for the first region and the first counter value of the first region.

17. The memory system according to claim 16, wherein in response to the number of times a second region of the plurality of regions has been accessed being updated and the first cache has stored therein an entry for the second region that includes the region identifier for the second region and the counter value of the second region, the controller stores in the second cache a new entry that includes the region identifier for the second region, an updated first counter value of the second region, and the second counter value of the second region indicating a difference between the updated first counter value of the second region and the counter value of the second region stored in the first cache, and deletes the entry for the second region stored in the first cache.

18. The memory system according to claim 15, wherein the first cache stores an entry for each of the regions.

19. The memory system according to claim 15, wherein the first cache stores an entry for each of a subset of the regions.

20. The memory system according to claim 15, wherein the nonvolatile memory is a rewritable memory and the first counter values respectively indicate the number of times the plurality of regions has been accessed for either a read or a write, and
the first counter value for a region is increased by a first value in response to a read access to the region and by a second value larger than the first value in response to a write access to the region.

* * * * *

UNITED STATES PATENT AND TRADEMARK OFFICE
CERTIFICATE OF CORRECTION

| | | |
|---|---|---|
| PATENT NO. | : 12,229,412 B2 | Page 1 of 1 |
| APPLICATION NO. | : 18/176446 | |
| DATED | : February 18, 2025 | |
| INVENTOR(S) | : Kazuhiro Fukutomi | |

It is certified that error appears in the above-identified patent and that said Letters Patent is hereby corrected as shown below:

On the Title Page

1. Item (30), the foreign priority application was omitted. The following should be added:
June 29, 2022 (JP)................2022-104111.

In the Claims

2. Claim 1, Column 46, Line 3:
Insert --stored in the volatile memory and values of the plurality of first counter values that were-- between the words "currently" and "most".

Signed and Sealed this
Sixth Day of May, 2025

Coke Morgan Stewart
*Acting Director of the United States Patent and Trademark Office*